United States Patent
Leonard

(10) Patent No.: US 11,661,991 B2
(45) Date of Patent: *May 30, 2023

(54) GAS SPRING AND GAS DAMPER ASSEMBLIES AS WELL AS SUSPENSION SYSTEMS AND METHODS OF ASSEMBLY

(71) Applicant: Firestone Industrial Products Company, LLC, Nashville, TN (US)

(72) Inventor: Joshua R. Leonard, Noblesville, IN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 121 days.

This patent is subject to a terminal disclaimer.

(21) Appl. No.: 17/156,850

(22) Filed: Jan. 25, 2021

(65) Prior Publication Data
US 2021/0140503 A1    May 13, 2021

Related U.S. Application Data

(62) Division of application No. 15/770,641, filed as application No. PCT/US2016/059798 on Oct. 31, 2016, now Pat. No. 10,900,534.

(Continued)

(51) Int. Cl.
*F16F 9/04* (2006.01)
*B60G 17/052* (2006.01)
*F16F 9/05* (2006.01)

(52) U.S. Cl.
CPC .......... *F16F 9/049* (2013.01); *B60G 17/0521* (2013.01); *F16F 9/055* (2013.01); *F16F 9/0454* (2013.01); *F16F 9/0472* (2013.01)

(58) Field of Classification Search
CPC .......... F16F 9/049; F16F 9/055; F16F 9/0454; F16F 9/0472; F16F 9/057; F16F 9/3214;
(Continued)

(56) References Cited

U.S. PATENT DOCUMENTS 6,422,543 B1    6/2002  Fejerdy
6,695,294 B2    2/2004  Miller
(Continued)

FOREIGN PATENT DOCUMENTS

WO      2013181241 A1    12/2013
WO      WO 2014/036541    3/2014
(Continued)

OTHER PUBLICATIONS

International Search Report dated Feb. 13, 2017 for corresponding Application No. PCT/US2016/059798.

*Primary Examiner* — Pamela Rodriguez
(74) *Attorney, Agent, or Firm* — Thomas R. Kingsbury; Matthew P. Dugan

(57) ABSTRACT

Gas spring and gas damper assemblies include a gas spring and a gas damper. The gas spring includes a flexible spring member with opposing end members secured thereto and at least partially defining a spring chamber. An elongated damping passage having a spiral configuration extends through one of the end members. The gas damper includes a damper housing that at least partially defines a damping chamber in fluid communication with the spring chamber through the elongated damping passage. A damper piston assembly is received within the damping chamber and secured to the other of the end members. Suspension systems and methods are also included.

20 Claims, 24 Drawing Sheets

US 11,661,991 B2
Page 2

Related U.S. Application Data

(60) Provisional application No. 62/249,260, filed on Oct. 31, 2015.

(58) Field of Classification Search
CPC ........ F16F 9/3405; F16F 9/54; F16F 2238/04; F16F 2222/126; F16F 2230/0005; F16F 2230/18; F16F 2230/28; F16F 2236/04; B60G 17/0521; B60G 11/27; B60G 15/14; B60G 2202/152
See application file for complete search history.

(56) References Cited

U.S. PATENT DOCUMENTS

| | | | |
|---|---|---|---|
| 7,213,799 B2 | 5/2007 | Behmenburg et al. |
| 8,641,051 B2 | 2/2014 | Pavuk |
| 9,695,901 B2 | 7/2017 | Leonard |
| 9,738,131 B2 | 8/2017 | Keeler |
| 9,809,075 B2 | 11/2017 | Bounds |
| 10,900,534 B2 * | 1/2021 | Leonard | F16F 9/049 |
| 2004/0124571 A1 | 7/2004 | Gold et al. |
| 2006/0208404 A1 | 9/2006 | Cmich |
| 2006/0226586 A1 | 10/2006 | Levy |
| 2011/0115140 A1 | 5/2011 | Moulik |
| 2011/0140324 A1 | 6/2011 | Naber |
| 2013/0234377 A1 | 9/2013 | Leonard |
| 2014/0246817 A1 | 9/2014 | Bounds |
| 2014/0345450 A1 | 11/2014 | Leonard |
| 2015/0008627 A1 | 1/2015 | Leonard |
| 2015/0130146 A1 | 5/2015 | Moulik |
| 2015/0217617 A1 | 8/2015 | Leonard |
| 2016/0101663 A1 | 4/2016 | Leonard |
| 2016/0121682 A1 | 5/2016 | Leonard |
| 2016/0236532 A1 | 8/2016 | Moulik |

FOREIGN PATENT DOCUMENTS

| | | |
|---|---|---|
| WO | 2014179581 A1 | 11/2014 |
| WO | 2015065989 A1 | 5/2015 |

* cited by examiner

# GAS SPRING AND GAS DAMPER ASSEMBLIES AS WELL AS SUSPENSION SYSTEMS AND METHODS OF ASSEMBLY This application is a divisional of U.S. patent application Ser. No. 15/770,641, filed on Apr. 24, 2018, which is the National Stage of International Application No. PCT/US2016/059798, filed on Oct. 31, 2016, which claims the benefit of priority from U.S. Provisional Patent Application No. 62/249,260, filed on Oct. 31, 2015, the entire contents of each of which is hereby incorporated herein by reference.

BACKGROUND

The subject matter of the present disclosure broadly relates to the art of gas spring devices and, more particularly, to gas spring and gas damper assemblies that include a spring chamber as well as a damping chamber that is separated into first and second damping chamber portions by a damper piston with an elongated passage that is capable of providing pressurized gas damping in fluid communication between the spring chamber and one of the first and second portions of the damping chamber. Suspension systems including one or more of such gas spring and gas damper assemblies as well as methods of assembly are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and gas damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring elements as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Pat. No. 7,213,799. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies may relate to the challenge of balancing desired performance levels with size and/or space limitations associated with the particular application and/or use for which the gas spring and gas damper assemblies are intended. As one example, motorized vehicles commonly include significant packaging and/or space limitations that can reduce the area that is available adjacent the gas spring and gas damper assembly. As such, in some cases, a reduced volume of pressurized gas may be used. In other cases, the desired volume of pressurized gas may be provided in a remote location relative to the gas spring and gas damper assembly. In either case, some decrease in damping performance of conventional constructions may result.

Accordingly, it is desired to develop gas spring and gas damper assemblies as well as a suspension system including one or more of such assemblies that overcome the foregoing and/or other difficulties associated with known constructions, and/or which may otherwise advance the art of gas spring and gas damper assemblies.

BRIEF DESCRIPTION

One example of an end member in accordance with the subject matter of the present disclosure is dimensioned for securement to an associated flexible spring member to at least partially form an associated gas spring and gas damper assembly having an associated spring chamber and an associated damping chamber. The end member can have a longitudinal axis and include an end member wall that extends peripherally about the longitudinal axis. The end member wall can include an outer side wall portion that extends longitudinally along the end member and includes an outer surface dimensioned to abuttingly engage the associated flexible spring member. An end wall portion can be oriented transverse to the longitudinal axis and operatively connected to the outer side wall portion. An elongated damping passage can extend along the end wall portion between a first end and a second end. The first end can be disposed in fluid communication with the associated spring chamber and the second end can be disposed in fluid communication with the associated damping chamber. The elongated damping passage extends along the end member wall in a spiral configuration in which one of the first and second ends is disposed radially inward of the other of the first and second ends.

In some cases, an end member in accordance with the foregoing paragraph can include the spiral configuration of the elongated damping passage disposed in a plane oriented transverse to the longitudinal axis.

In some cases, an end member in accordance with the subject matter of the present disclosure, such as is described in either of the two foregoing paragraphs, can include an elongated damping passage having a spiral configuration that is at least partially formed into the end member wall of the end member. In other cases, an end member in accordance with the subject matter of the present disclosure, such as is described in either of the two foregoing paragraphs, can include an end plate into which an elongated damping passage having a spiral configuration that is at least partially formed.

One example of a gas spring and gas damper assembly in accordance with the subject matter of the present disclosure can include a gas spring and a gas damper. The gas spring can include a flexible spring member having a longitudinal axis. The flexible spring member can include a flexible wall extending longitudinally between first and second ends and peripherally about the axis to at least partially define a spring chamber. A first end member can be operatively secured to the first end of the flexible spring member such that a substantially fluid-tight seal is formed therebetween. A second end member can be disposed in spaced relation to the first end member and can be operatively secured to the second end of the flexible spring member such that a substantially fluid-tight seal is formed therebetween. The second end member can include an end member wall that includes an outer side wall portion that extends longitudinally along the second end member. The end member wall can also include an end wall portion oriented transverse to the longitudinal axis. The end member wall can at least partially define an end member cavity disposed radially inward of the outer side wall portion. The second end member can include an elongated damping passage that can extend across at least part of the end wall portion of the end member wall. The elongated passage can extend between a first passage end and a second passage end. The elongated damping passage can have a spiral configuration with the first passage end disposed in fluid communication with the spring chamber. The gas damper can include a housing sleeve and a damper piston assembly. The housing sleeve can extend longitudinally between opposing sleeve ends. The housing sleeve can include a sleeve wall with an inner surface and an outer surface. The housing sleeve can be at least partially received within the end member cavity with the inner surface of the sleeve wall at least partially defining a damping chamber. A damper piston assembly can include a damper piston and an elongated damper rod operatively connected to the damper piston. The damper piston can be positioned within the damping chamber and can include an outer side wall disposed adjacent the inner surface of the inner sleeve. The damper piston can separate the piston chamber into first and second chamber portions with at least one of the first and second chamber portions disposed in fluid communication with the spring chamber through the second end of the elongated damping passage. The damper rod can be operatively connected to the first end member. Upon extension and compression of the gas spring and gas damper assembly, the damper piston can be reciprocally displaced within the damping chamber to generate pressurized gas damping. Additionally, pressurized gas damping can be generated from pressurized gas transfer through the elongated damping passage between the spring chamber and the damping chamber.

Another example of a gas spring and gas damper assembly in accordance with the subject matter of the present disclosure can include a gas spring and a gas damper. The gas spring can include a flexible spring member having a longitudinal axis. The flexible spring member can include a flexible wall extending longitudinally between first and second ends and peripherally about the axis to at least partially define a spring chamber. A first end member can be operatively secured to the first end of the flexible spring member such that a substantially fluid-tight seal is formed therebetween. A second end member can be disposed in spaced relation to the first end member and can be operatively secured to the second end of the flexible spring member such that a substantially fluid-tight seal is formed therebetween. The second end member can include an end member wall that includes an outer side wall portion that extends longitudinally along the second end member. The end member wall can also include an end wall portion oriented transverse to the longitudinal axis. The end member wall can at least partially define an end member cavity disposed radially inward of the outer side wall portion. The gas damper can include a housing sleeve and a damper piston assembly. The housing sleeve can extend longitudinally between opposing sleeve ends. The housing sleeve can include a sleeve wall with an inner surface and an outer surface. The housing sleeve can be at least partially received within the end member cavity with the inner surface of the sleeve wall at least partially defining a damping chamber. A damper piston assembly can include a damper piston and an elongated damper rod operatively connected to the damper piston. The damper piston can be positioned within the damping chamber and can include an outer side wall disposed adjacent the inner surface of the inner sleeve. The damper piston can separate the piston chamber into first and second chamber portions with at least one of the first and second chamber portions disposed in fluid communication with the spring chamber through the second end of the elongated damping passage. The damper rod can be operatively connected to the first end member. The damper rod can include a first passage extending in fluid communication with the spring chamber and one of the first and second chamber portions. The damper rod can also include a second passage that is separate from the first passage and extends in fluid communication between the spring chamber and the other of the first and second chamber portions with one of the first and second passages being an elongated damping passage extending helically within the damper rod. Upon extension and compression of the gas spring and gas damper assembly, the damper piston can be reciprocally displaced within the damping chamber to generate pressurized gas damping. Additionally, pressurized gas damping can be generated from pressurized gas transfer through the elongated damping passage between the spring chamber and the damping chamber.

One example of a suspension system in accordance with the subject matter of the present disclosure can include a pressurized gas system that includes a pressurized gas source and a control device. The suspension system can also include at least one gas spring and gas damper assembly according to either one of the two foregoing paragraphs. The at least one gas spring and gas damper assembly can be disposed in fluid communication with the pressurized gas source through the control device such that pressurized gas can be selectively transferred into and out of the spring chamber.

One example of a method of manufacturing a gas spring and gas damper assembly in accordance with the subject matter of the present disclosure can include providing a flexible spring member having a longitudinal axis. The flexible spring member can include a flexible wall extending longitudinally between first and second ends and peripherally about the axis to at least partially define a spring chamber. The method can also include providing a first end member and securing the first end member across the first end of the flexible spring member such that a substantially fluid-tight seal is formed therebetween. The method can further include providing a second end member. The second end member can include an end member wall including an outer side wall portion and an end wall portion with the outer side wall portion extending longitudinally along the second end member and the end wall portion oriented transverse to the longitudinal axis. The end member wall at least partially defining an end member cavity disposed radially inward of the outer side wall portion. The method can also include providing an elongated damping passage having one of a helical and spiral configuration, and extending between a first passage end and a second passage end. The method can also include securing the second end member across the second end of the flexible spring member such that a substantially fluid-tight seal is formed therebetween. The method can further include providing a housing sleeve that can extend longitudinally between opposing sleeve ends with the housing sleeve including a sleeve wall with an inner surface and an outer surface. The method can still further include positioning the housing sleeve at least partially within the end member cavity such that the inner surface of the sleeve wall at least partially defines a damping chamber. The method can also include providing a damper piston assembly that can include a damper piston and an elongated damper rod that is operatively connected to the damper piston. The damper piston can include an outer side wall. The method can further include positioning the damper piston within the damping chamber such that the outer side wall is disposed adjacent the inner surface of the housing sleeve. The damper piston can separate the piston chamber into first and second chamber portions. The method can also include connecting the first end of the elongated damping passage in fluid communication with the spring chamber. The method can further include connecting at least one of the first and second chamber portions in fluid communication with the spring chamber through the second end of the elongated damping passage. And, the method can include connecting the damper rod to the first end member such that upon extension and compression of the gas spring and gas damper assembly, the damper piston is reciprocally displaced within the damping chamber to generate pressurized gas damping with additional pressurized gas damping being generated from pressurized gas transfer between the spring chamber and the damping chamber through the elongated damping passage.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
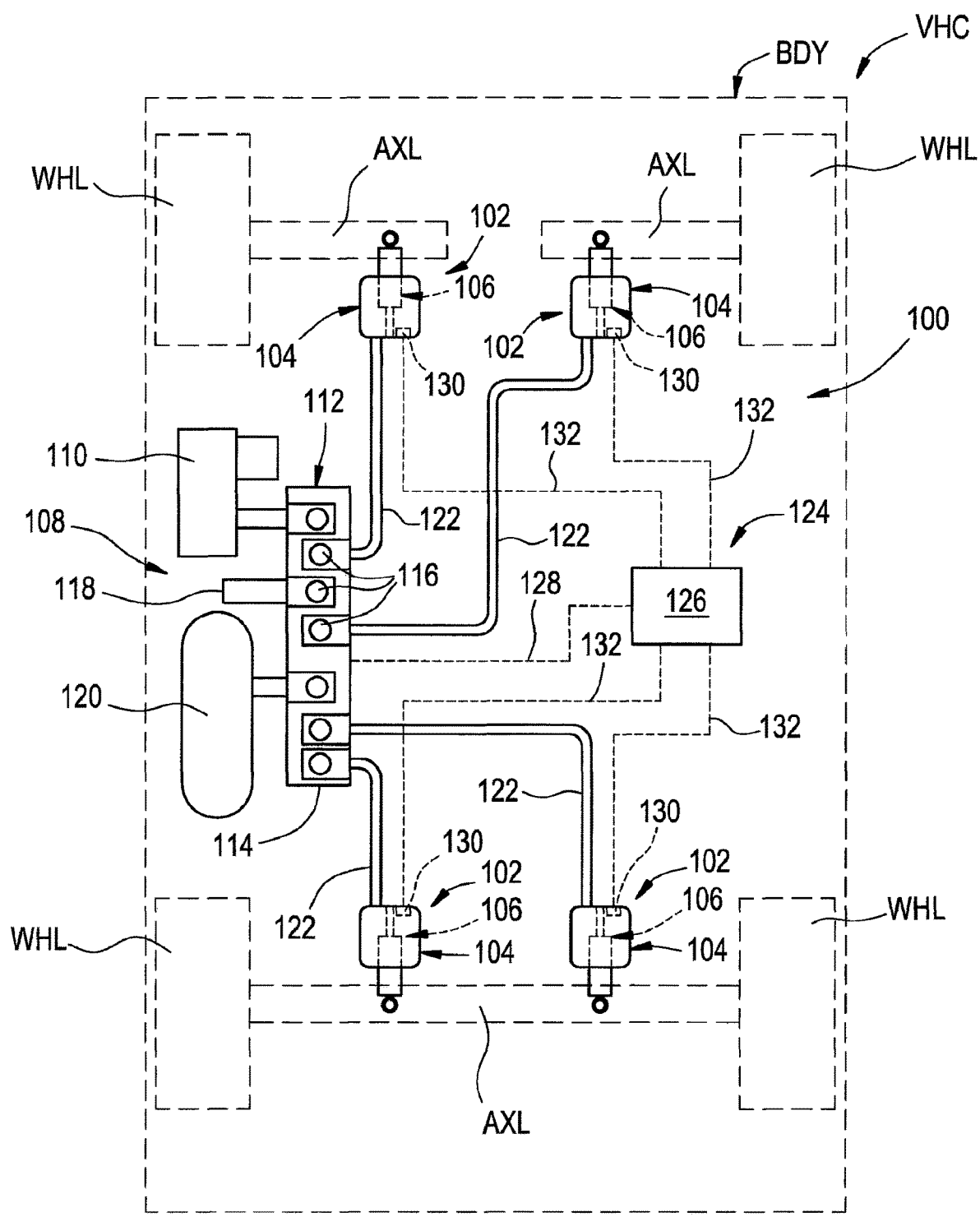
FIG. 1 is a schematic representation of one example of a suspension system of an associated vehicle that includes one or more gas spring and gas damper assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and gas damper assemblies 102 that are operatively connected between the sprung and unsprung masses of the vehicle. Depending on desired performance characteristics and/or other factors, the suspension system may, in some cases, also include damping members (not shown) of a typical construction that are provided separately from assemblies 102 and secured between the sprung and unsprung masses in a conventional manner. In a preferred arrangement, however, gas spring and gas damper assemblies 102 will be sized, configured and operative to provide the desired performance characteristics for the suspension system without the use of additional damping members (e.g., conventional struts or shock absorbers) that are separately provided.

In the arrangement shown in FIG. 1, suspension system 100 includes four gas spring and gas damper assemblies 102, one of which is disposed toward each corner of the associated vehicle adjacent a corresponding wheel WHL. However, it will be appreciated that any other suitable number of gas spring and damper assemblies could alternately be used in any other configuration and/or arrangement. As shown in FIG. 1, gas spring and gas damper assemblies 102 are supported between axles AXL and body BDY of associated vehicle VHC, and include a gas spring 104 and a gas damper 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and gas damper assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 and/or gas dampers 106 of assemblies 102 through suitable gas transfer lines 122. As such, pressurized gas can be selectively transferred into and/or out of the gas springs and/or the gas dampers through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the height or distance signals therefrom. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Figure 6:
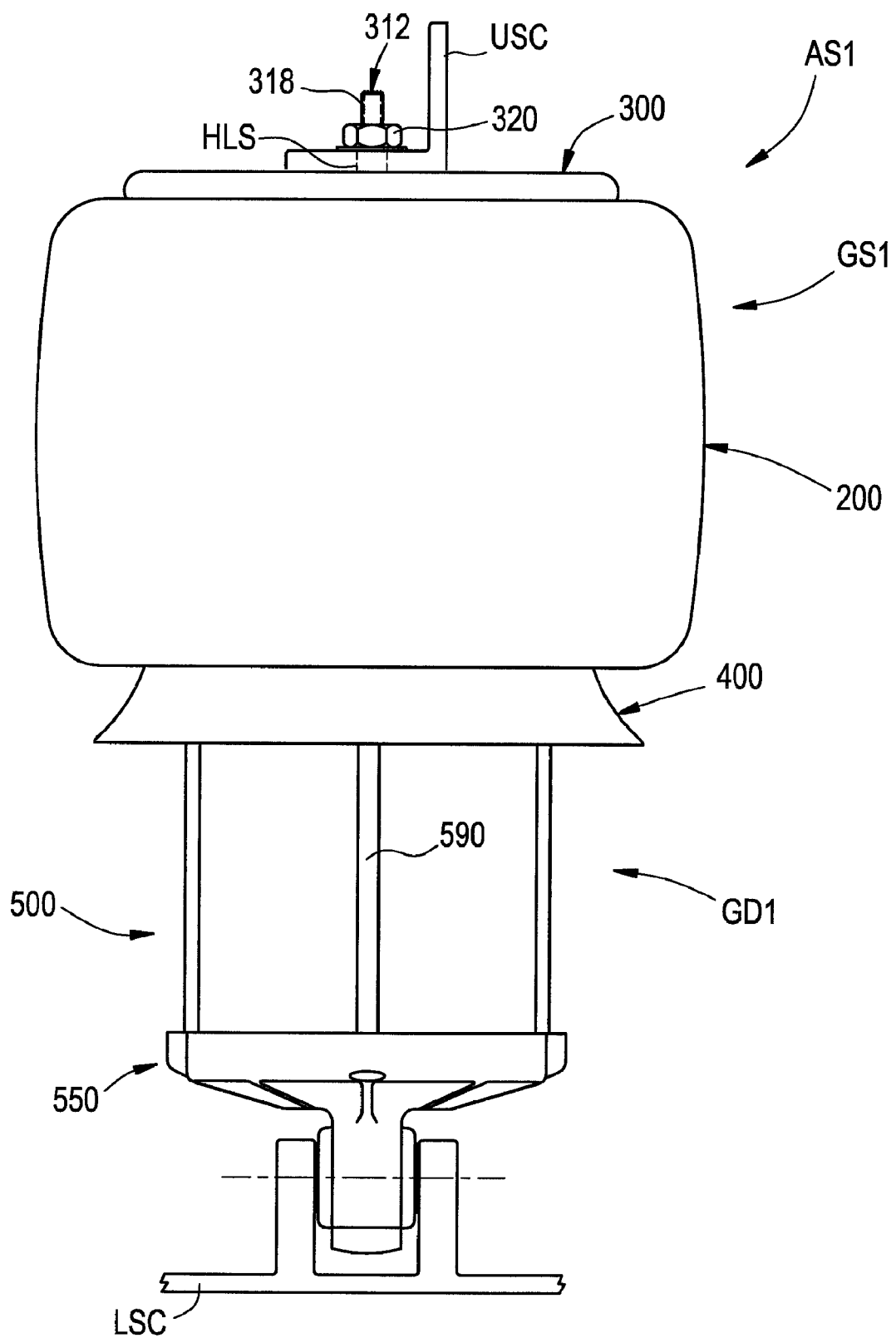
FIG. 6 is a side elevation view of the exemplary gas spring and gas damper assembly in FIGS. 2-5.
Figure 7:
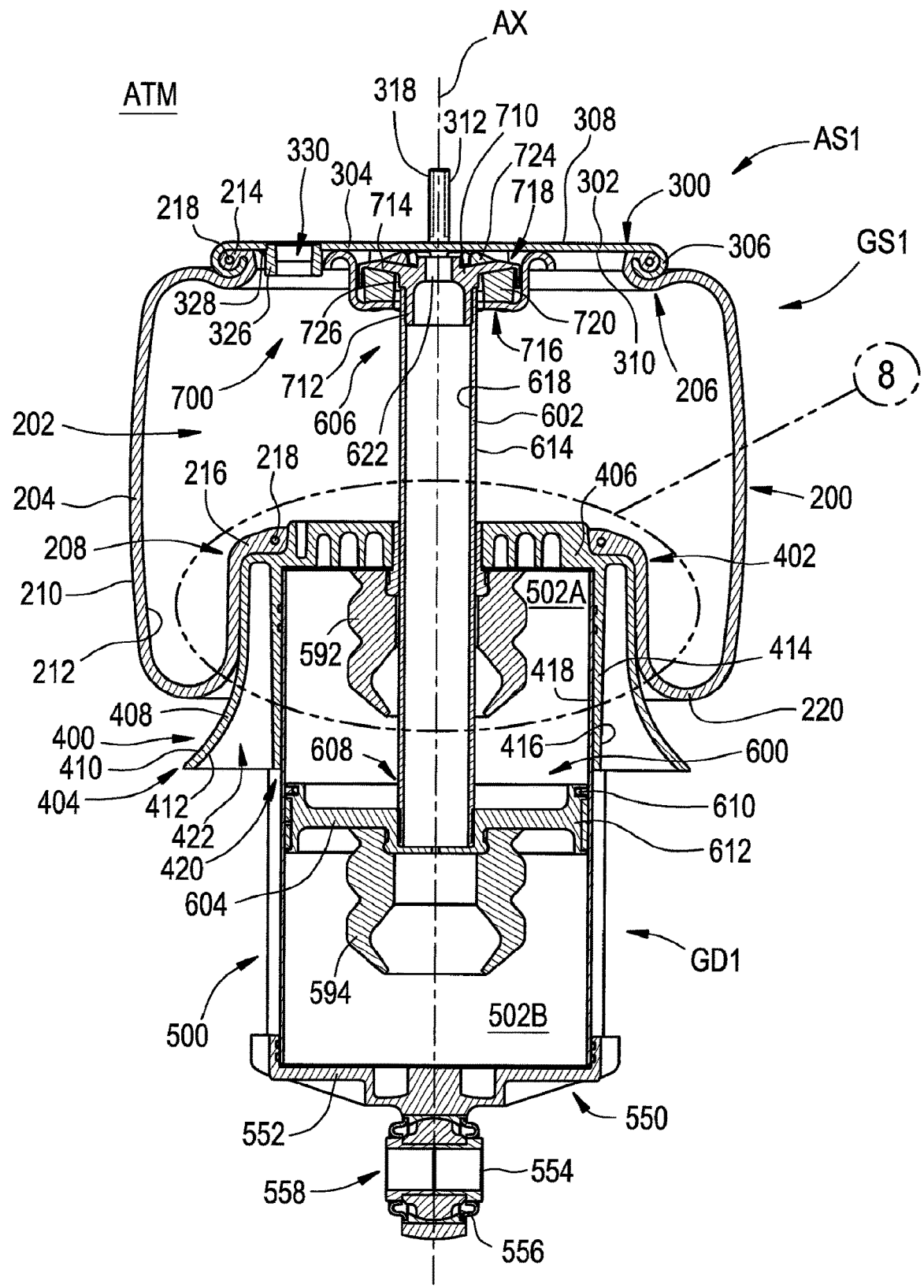
FIG. 7 is a cross-sectional side view of the exemplary gas spring and gas damper assembly in FIGS. 2-6 taken from along line 7-7 in FIG. 4.
Figure 8:
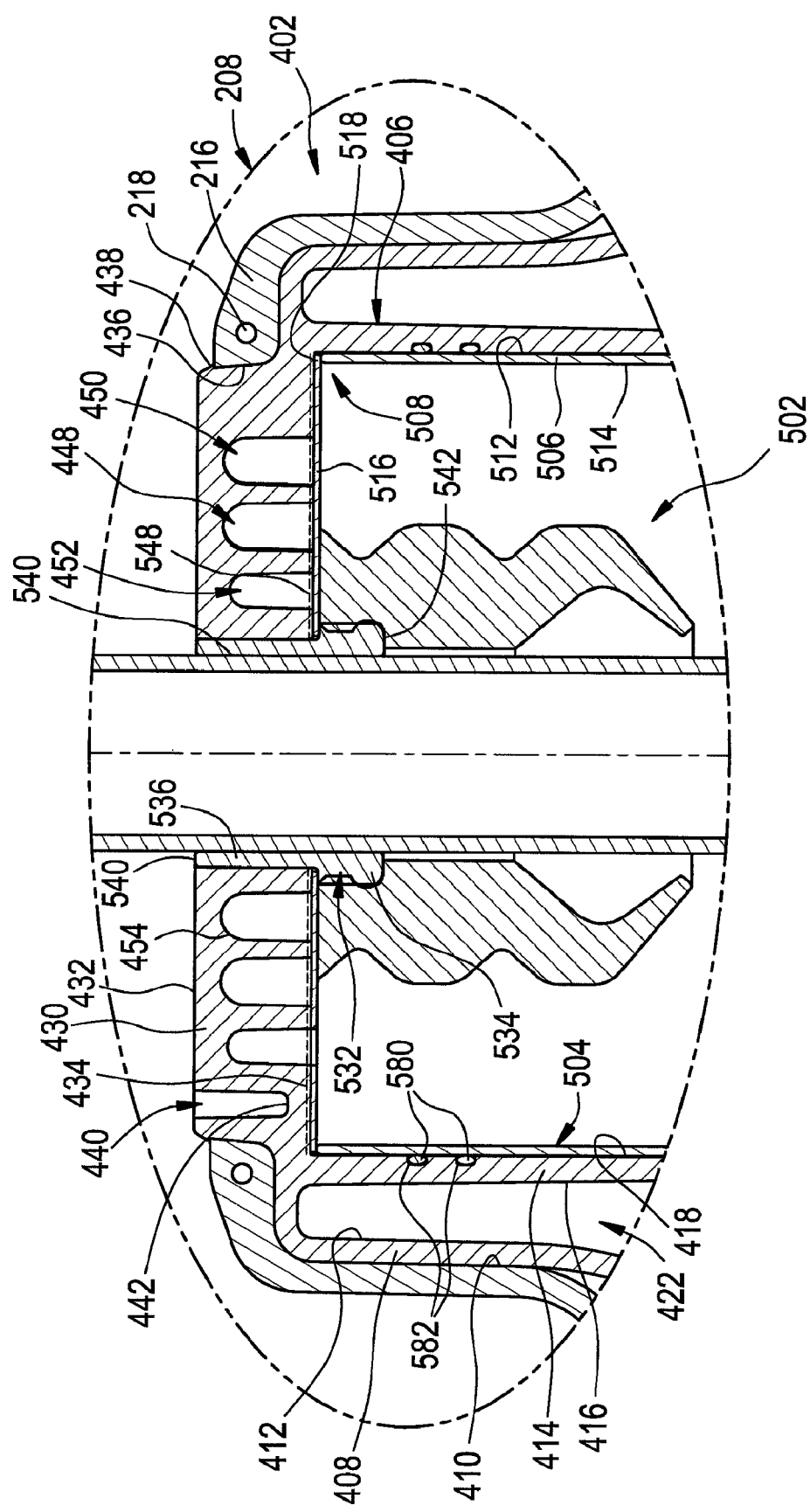
FIG. 8 is a greatly enlarged view of the portion of the exemplary gas spring and gas damper in FIGS. 2-7 that is identified as Detail 8 in FIG. 7.
Figure 9:
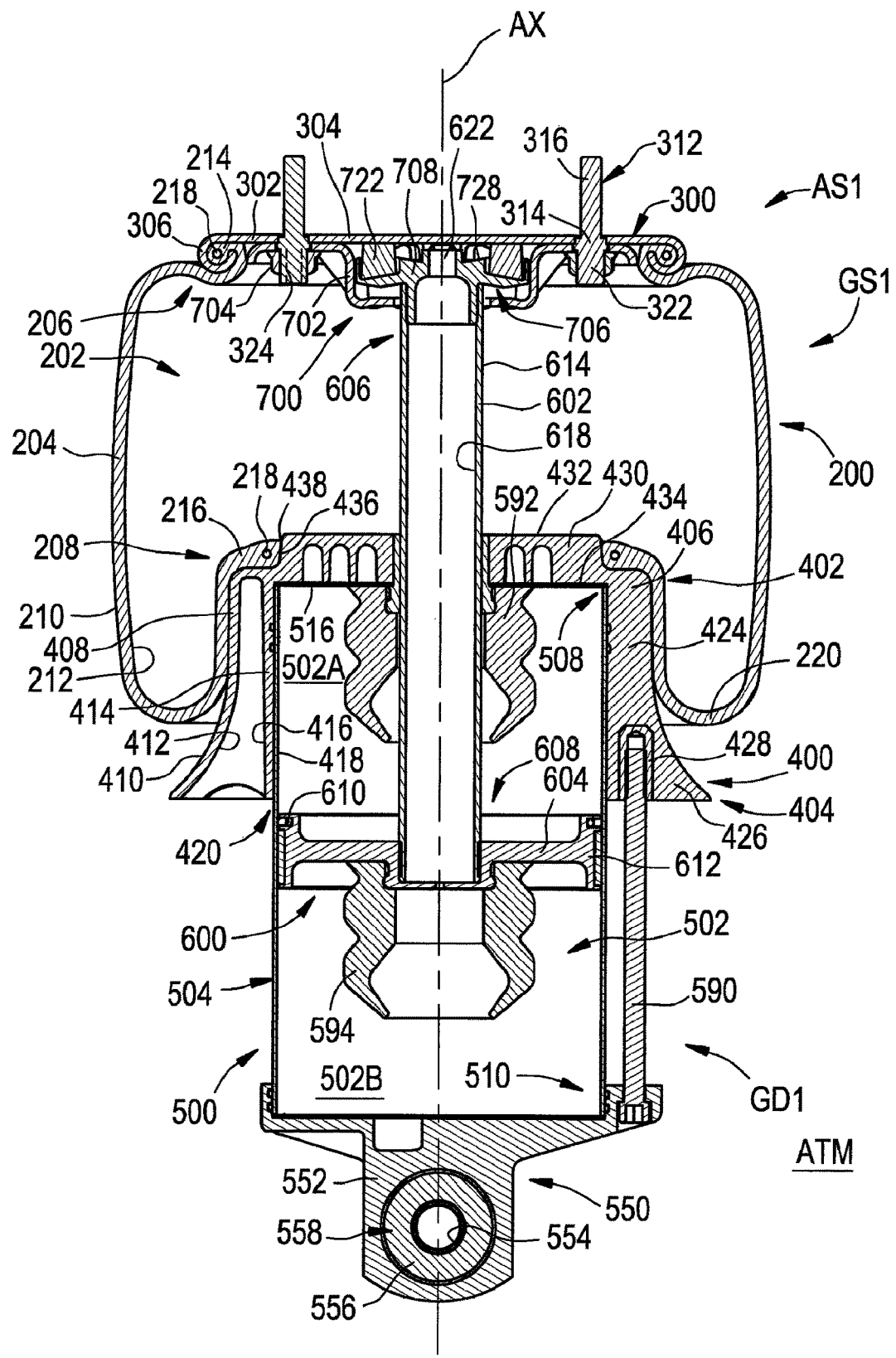
FIG. 9 is a cross-sectional side view of the exemplary gas spring and gas damper assembly in FIGS. 2-8 taken from along line 9-9 in FIG. 4.

Having described an example of a suspension system (e.g., suspension system 100) that can include gas spring and gas damper assemblies in accordance with the subject matter of the present disclosure, one example of such a gas spring and gas damper assembly will now be described in connection with FIGS. 2-11. As shown therein, one example of a gas spring and gas damper assembly AS1, such as may be suitable for use as one or more of gas spring and gas damper assemblies 102 in FIG. 1, for example. Gas spring and gas damper assembly AS1 is shown as including a gas spring (or gas spring assembly) GS1, such as may correspond to one of gas springs 104 in FIG. 1, for example, and a gas damper (or gas damper assembly) GD1, such as may correspond to one of gas dampers 106 in FIG. 1, for example. Gas spring assembly GS1 and gas damper assembly GD1 can be operatively secured to one another and fluidically coupled with one another in any suitable manner, such as is described hereinafter, for example. A longitudinal axis AX extends lengthwise along assembly AS1, as shown in FIGS. 7 and 9.

Gas spring assembly GS1 can include a flexible spring member 200 that can extend peripherally around axis AX and can be secured between opposing end members (or end member assemblies) 300 and 400 in a substantially fluid-tight manner such that a spring chamber 202 is at least partially defined therebetween. Gas damper assembly GD1 can include a damper housing 500 that is operatively supported on or along end member 400 and a damper rod assembly 600 that is operatively associated with damper housing 500. An end mount 700 can operatively connect damper rod assembly 600 with end member 300.

It will be appreciated that flexible spring member 200 can be of any suitable size, shape, construction and/or configuration. Additionally, the flexible spring member can be of any type and/or kind, such as a rolling lobe-type or convoluted bellows-type construction, for example. Flexible spring member 200 is shown in FIGS. 2-7 and 9 as including a flexible wall 204 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 204 can extend in a generally longitudinal direction between opposing ends 206 and 208. Additionally, flexible wall 204 can include an outer surface 210 and an inner surface 212. The inner surface can at least partially define spring chamber 202 of gas spring assembly GS1. Flexible wall 204 can include an outer or cover ply (not identified) that at least partially forms outer surface 210. Flexible wall 204 can also include an inner or liner ply (not identified) that at least partially forms inner surface 212. In some cases, flexible wall 204 can further include one or more reinforcing plies disposed between outer and inner surfaces 210 and 212. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 200 can include any feature or combination of features suitable for forming a substantially fluid-tight connection with end member 300 and/or end member 400. As one example, flexible spring member 200 can include a mounting bead 214 disposed along end 206 of flexible wall 204 and a mounting bead 216 disposed along end 208 of the flexible wall. In some cases, the mounting bead, if provided, can, optionally, include a reinforcing element, such as an endless, annular bead wire 218, for example.

Gas spring and gas damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 6, for example, end member 300 can be operatively disposed along a first or upper structural component USC, such as associated vehicle body BDY in FIG. 1, for example, and can be secured thereon in any suitable manner. As another example, damper housing 500 can be operatively disposed along a second or lower structural component LSC, such as one of associated axles AXL in FIG. 1, for example, and can be secured thereon in any suitable manner.

Additionally, it will be appreciated that the end members can be of any suitable type, kind, construction and/or configuration, and can be operatively connected to or otherwise secured to the flexible spring member in any suitable manner. In the exemplary arrangement shown in FIGS. 2-4, 6, 7 and 9, for example, end member 300 is of a type commonly referred to as a bead plate and includes an end member wall 302 with an inner wall portion 304 and an outer peripheral wall portion 306. End member 300 is disposed along end 206 of flexible wall 204 with outer peripheral wall portion 306 crimped or otherwise deformed around at least a portion of mounting bead 214 such that a substantially fluid-tight seal can be formed between flexible spring member 200 and end member 300. Inner wall portion 304 can have an approximately planar outer surface 308 dimensioned to abuttingly engage an associated structural component (e.g., upper structural component USC). Inner wall portion 304 can also have an approximately planar inner surface 310 disposed in facing relation to spring chamber 202.

As indicated above, end member 300 can be disposed in operative engagement on or along first or upper structural component USC (FIG. 6), such as associated vehicle body BDY in FIG. 1, for example, and can be secured thereon in any suitable manner. For example, one or more securement devices, such as mounting studs 312, for example, can be included along end member 300. In some cases, mounting studs 312 can include a section 314 dimensioned for attachment to end member wall 302 in a suitable manner, such as, for example, by way of a flowed-material joint or a press-fit connection.

Additionally, mounting studs 312 can include a section 316 that extends axially from along section 314 and can include one or more helical threads 318. Section 316 can be dimensioned to extend through corresponding mounting holes HLS (FIG. 6) in upper structural component USC (FIG. 6) and can receive one or more securement devices (e.g., threaded nuts) 320. Mounting studs 312 can also include a section 322 that extends axially from along section 314 in a direction opposite section 316. As such, section 322 can extend into spring chamber 202 and can include one or more helical threads 324 dimensioned to receive one or more threaded nuts or other securement devices, such as, for example, may be used to secure one or more devices and/or components of end mount 700 on or along inside surface 310 of end member 300, for example.

Figure 2:
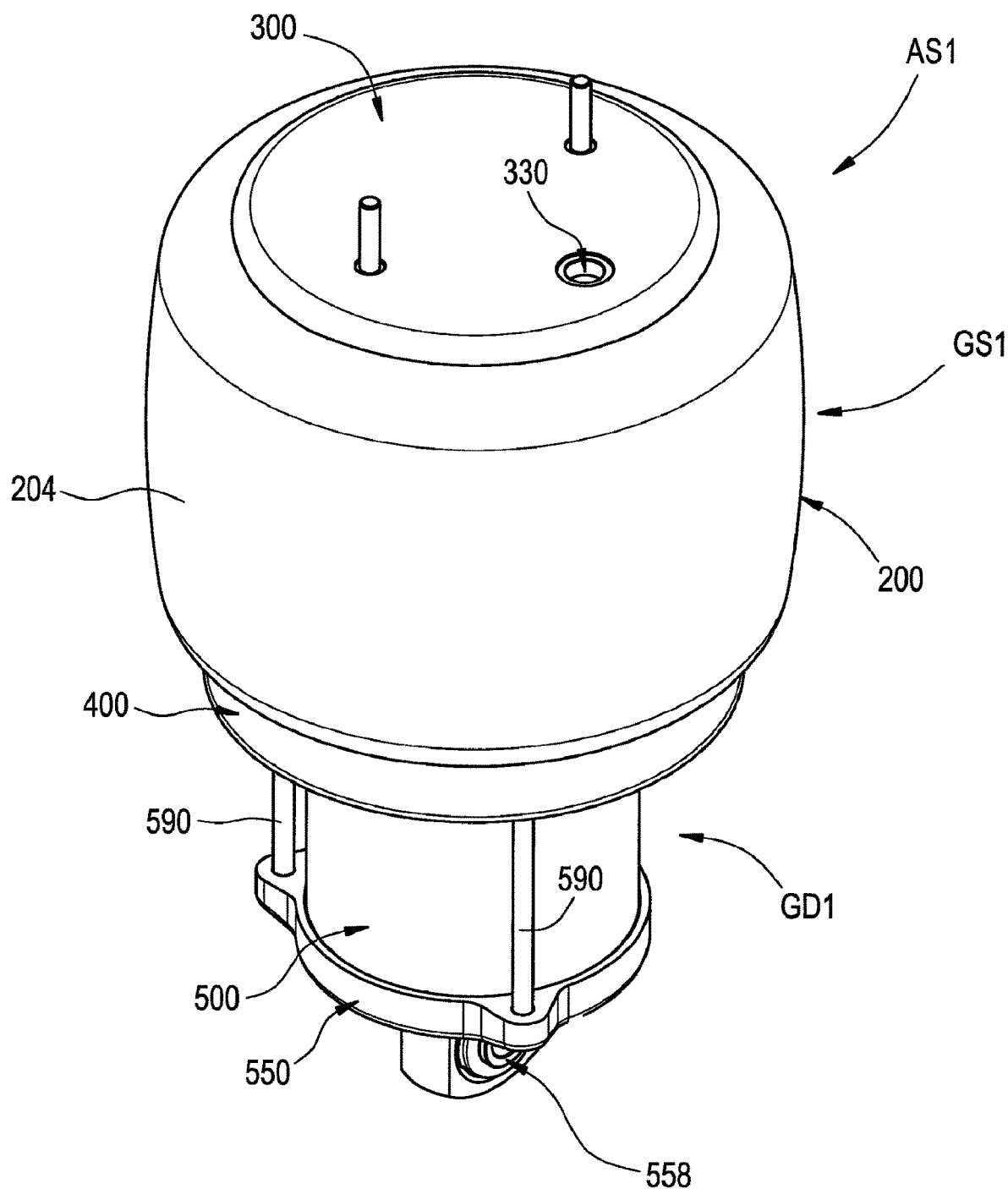
FIG. 2 is a top perspective view of one example of a gas spring and gas damper assembly in accordance with the subject matter of the present disclosure.
Figure 3:
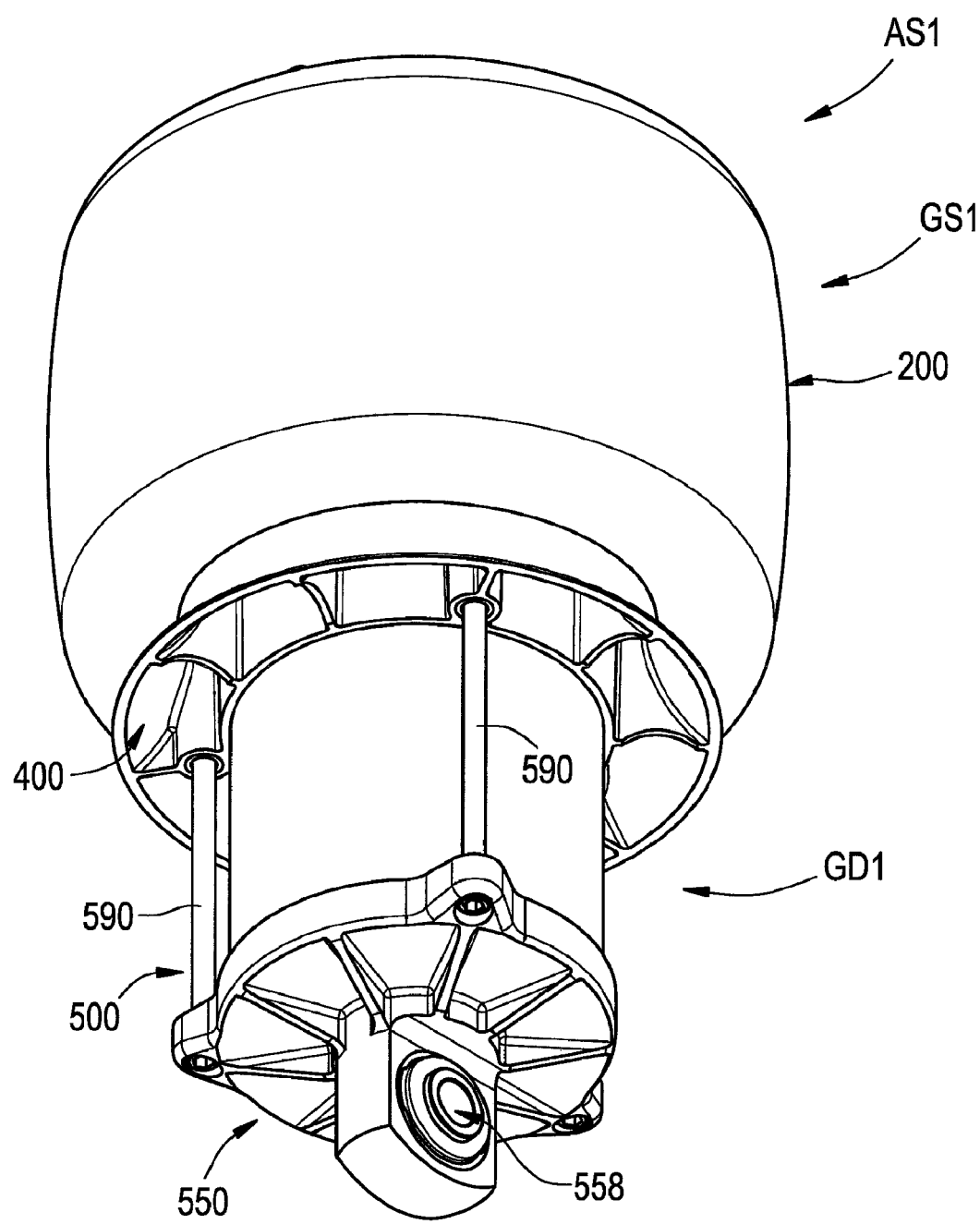
FIG. 3 is a bottom perspective view of the exemplary gas spring and gas damper assembly in FIG. 2.
Figure 4:
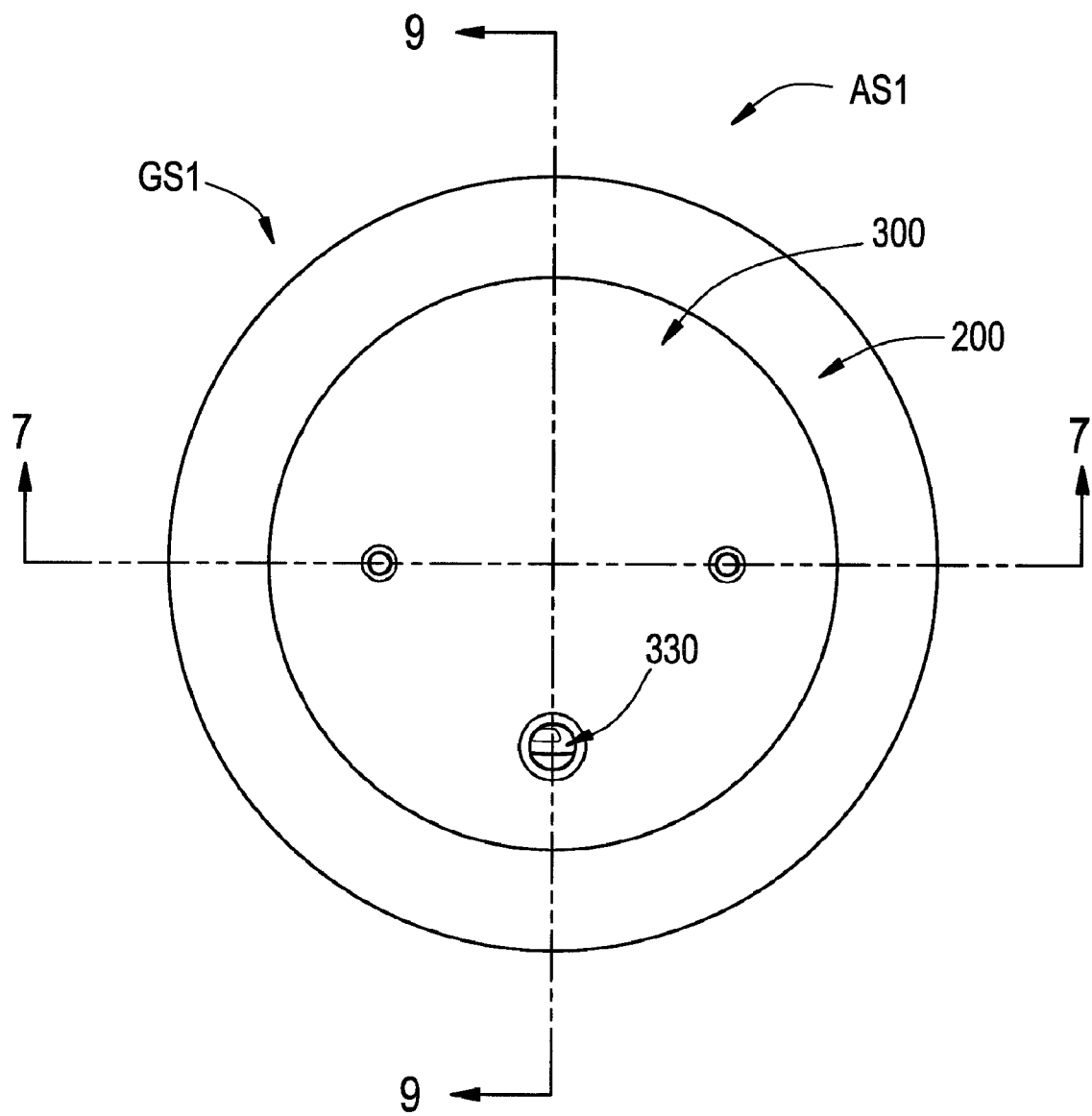
FIG. 4 is a top plan view of the exemplary gas spring and gas damper assembly in FIGS. 2 and 3.
Figure 5:
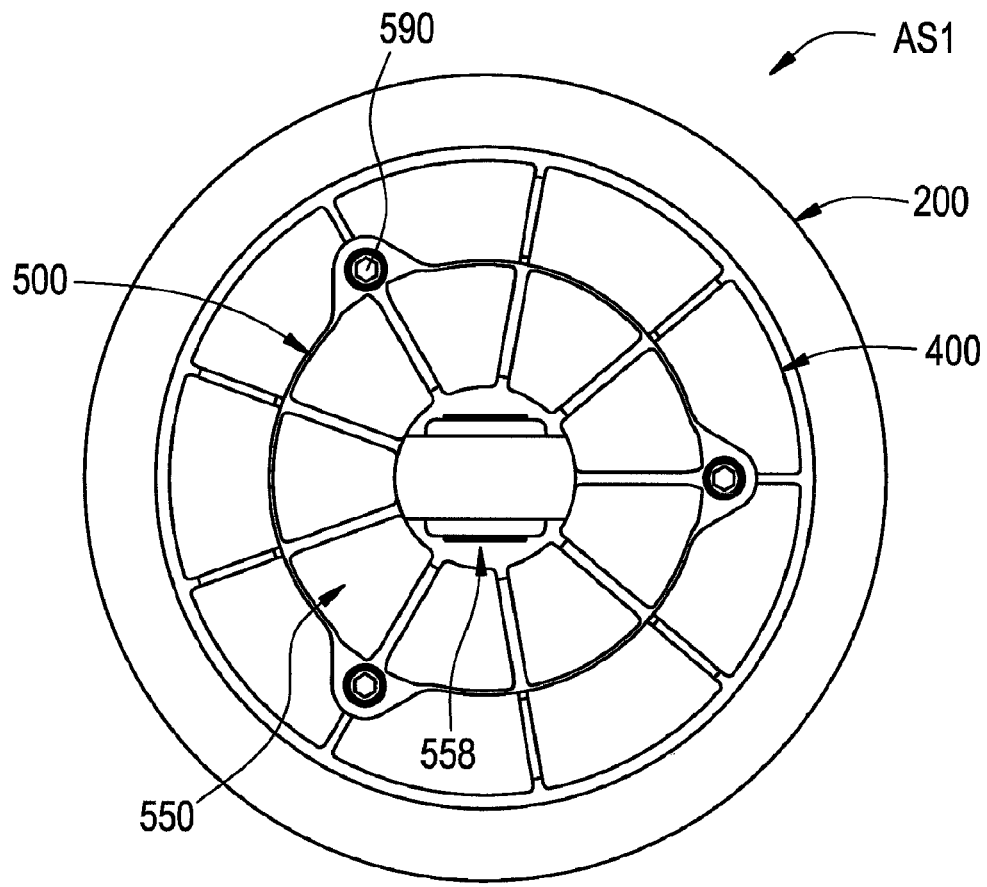
FIG. 5 is a bottom plan view of the exemplary gas spring and gas damper assembly in FIGS. 2-4.

Furthermore, one or more fluid communication ports or transfer passages can optionally be provided to permit fluid communication with the spring chamber, such as may be used for transferring pressurized gas into and/or out of the spring chamber, for example. In some cases, a transfer passage can extend through one or more of the mounting studs. In other cases, such as is shown in FIGS. 2, 4 and 7, for example, end member 300 can include a passage fitting 326 that can be secured on or along end member wall 302 in a substantially fluid-tight manner, such as by way of a flowed-material joint 328, for example. A transfer passage 330 can extend through end member wall 302 and passage fitting 326 that is in fluid communication with spring chamber 212. It will be appreciated, however, that any other suitable fluid communication arrangement could alternately be used.

End member 400 is shown as being disposed in axially-spaced relation to end member 300, and as including features associated with a type of end member commonly referred to as a piston (or a roll-off piston). It will be recognized that a wide variety of sizes, shapes, profiles and/or configurations can and have been used in forming end members of the type and kind referred to as pistons or roll-off pistons, such as end member 400, for example. As such, it will be appreciated that the walls and/or wall portions of the end member can be of any suitable shape, profile and/or configuration, such as may be useful to provide one or more desired performance characteristics, for example, and that the profile shown in FIGS. 2-11 and 13-18 is merely exemplary.

End member 400 can extend lengthwise between opposing ends 402 and 404 that are axially spaced from one another. End member 400 can include an end member wall 406 that can have a first or outer side wall portion 408 that extends in a generally axial direction and includes an outside surface 410 and an inside surface 412. End member 400 can also include a second or inner side wall portion 414 that also extends in a generally axial direction. Inner side wall portion 414 is spaced radially inward from outer side wall portion 408 and includes an outside surface 416 and an inside surface 418. In a preferred arrangement, inside surface 418 of inner side wall portion 414 can at least partially define an inner cavity 420 within end member 400.

In the arrangement shown in FIGS. 2-11 and 13-18, end member 400 includes an outer cavity 422 extending into the end member between inside surface 412 of outer side wall portion 408 and outside surface 416 of inner side wall portion 414. In some cases, one or more support wall portions 424 can extend between and operatively interconnect the outer and inner side wall portions. Additionally, in some cases, one or more bosses or projections can be provided on or along the end member wall, such as may be suitable for including one or more securement devices and/or securement features. In the exemplary arrangement shown in FIGS. 2-11 and 13-18, for example, end member wall 406 can include boss wall portions 426 that can be formed or otherwise disposed along one or more of outer side wall portion 408, inner side wall portion 414 and/or support wall portions 424, for example. In some cases, one or more securement features (e.g., threaded passages) can extend into or be otherwise formed on or along the boss wall portions. In other cases, one or more securement devices 428, such as threaded metal inserts, for example, can be at least partially embedded within one of more of boss wall portions 426. It will be appreciated, however, that other configurations and/or arrangements could alternately be used.

End member wall 406 can also include an end wall portion 430 that can extend across and/or between any combination of one or more of outer side wall portion 408, inner side wall portion 414 and/or support wall portions 424. End wall portion 430 can be oriented transverse to axis AX and can at least partially form a closed end of inner cavity 420 of the end member. Additionally, end wall portion 430 can include opposing surfaces 432 and 434. As indicated above, it will be appreciated that the one or more end members of the gas spring and gas damper assembly can be operatively connected or otherwise secured to the flexible spring member in any suitable manner. In the case of end member 400, end member wall 406 can, for example, include an outer surface 436 that extends peripherally about axis AX and is dimensioned to receive mounting bead 216 disposed along end 208 of the flexible wall 204 such that a substantially fluid-tight seal can be formed therebetween. In some cases, a retaining ridge 438 can project radially outward beyond outer surface 436 and can extend peripherally along at least a portion thereof, such as may assist in retaining end 208 of flexible wall 204 in abutting engagement on or along the end member.

In an assembled condition, outer surface 210 of flexible wall 204 can be disposed in abutting engagement with outside surface 410 of outer side wall portion 408. In such an arrangement, flexible wall 204 of flexible spring member 200 can form a rolling lobe 220 along outside surface 410 of outer side wall portion 408. As gas spring and gas damper assembly AS1 is displaced between compressed and extended conditions, rolling lobe 220 can be displaced along outer surface 410 in a generally conventional manner.

As mentioned above, a gas spring and gas damper assembly in accordance with the subject matter of the present disclosure can include one or more elongated gas damping passages through which pressurized gas can flow to generate pressurized gas damping to dissipate kinetic energy acting on the gas spring and gas damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

As indicated above, a gas spring and gas damper assembly in accordance with the subject matter of the present disclosure can include one or more elongated gas damping passages fluidically connected between the spring chamber and one or more damping chambers or damping chamber portions. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

As discussed above, a gas spring and gas damper assembly in accordance with the subject matter of the present disclosure can include one or more elongated gas damping passages in fluid communication between the spring chamber and one or more damping chambers or damping chamber portions. Differential pressure between the volumes can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

In the exemplary construction shown in FIGS. 7-9, 10 and 13-18, end member wall 406 of end member 400 can include a plurality of recesses 440 that can extend into end member wall 406 from along surface 432. Recesses 440 are shown as being disposed in peripherally spaced relation to one another about axis AX. The recesses are also shown as being spaced radially outward from the axis toward outer surface 436 and varying in size and shape relative to one another. In a preferred arrangement, recesses 440 are blind recesses and include a bottom surface 442 such that the recesses do not extend or otherwise form a passage through end member wall 406.

End member wall 406 of end member 400 can include an opening or passage 444 extending through end wall portion 430 between surfaces 432 and 434. In a preferred arrangement, passage 444 can be oriented in approximately co-axial alignment with axis AX. Also, in a preferred arrangement, passage 444 can be dimensioned to receive and permit one or more components of gas damper assembly GD1 to extend through end wall portion 430, as discussed in greater detail below.

End member 400 can also include a passage or port 446 extending into and at least partially through end wall portion 430 of end member wall 406 from along surface 432. In a preferred arrangement, passage 446 is disposed radially outward of opening 444 and adjacent or otherwise toward outer surface 436 of end wall portion 430. As discussed above, a gas spring and gas damper assembly in accordance with the subject matter of the present disclosure can further include an elongated damping passage extending between and fluidically connecting the spring chamber and one or more damping chambers or damping chamber portions. As one example of a suitable construction, end member 400 can include an elongated damping passage 448 extending into, through or otherwise along at least a portion of end wall portion 430 of end member wall 406. In a preferred arrangement, elongated damping passage 448 has a first end 450 disposed in fluid communication with port 446 and a second end 452 disposed radially inward of port 446. In other cases, the passage or port could be disposed radially inward adjacent or otherwise toward passage 444 with the second end of the elongated damping passage disposed radially outward of the first end.

In either case, it will be appreciated that elongated damping passage 448 can be of any suitable shape, form, configuration and/or arrangement. In a preferred arrangement, elongated damping passage 448 can have a spiral-like or similar configuration. In such case, the elongated damping passage can be at least partially formed by a passage surface 454 that has a cross-sectional profile. In some cases, the cross-sectional profile can vary along the length of the elongated damping passage. In a preferred arrangement, however, the cross-sectional profile can be of an approximately uniform size, shape and configuration along the length of the elongated damping passage, such as is shown in FIGS. 7-9, 10 and 16-18, for example. The cross-sectional profile is taken from an orientation that is normal, perpendicular or at least transverse to the spiral-like path of the elongated damping passage. That is, the cross-sectional profile is oriented transverse to axis AX and is substantially-continuously rotated about the axis with the cross-sectional profile substantially-continuously displaced radially outward from adjacent axis AX to form the spiral-like configuration. In a preferred arrangement, such rotation of the cross-sectional profile of passage surface 454 can occur in an approximately single plane such that the spiral-like configuration of elongated damping passage 448 is disposed in a common plane that is oriented transverse to longitudinal axis AX.

In some cases, the cross-sectional profile of passage surface 454 can be endless or otherwise fully enclosed. In such cases, the corresponding elongated damping passage can be substantially-entirely embedded within the end wall portion of the end member wall. In other cases, the cross-sectional profile of passage surface 454 can be open (i.e., not fully enclosed). In such cases, the corresponding elongated damping passage can be open along one or more surfaces of end wall portion 430 of end member wall 406. For example, the cross-sectional profile of passage surface 454 is shown as having an approximately U-shaped cross-sectional configuration. As such, elongated damping passage 448 is formed within end wall portion 430 of end member wall 406 as an open channel that is accessible from along surface 434 of the end wall portion. It will be appreciated, however, that other configurations and/or arrangements could alternately be used. For example, a cross-sectional profile in a C-shaped configuration could be used.

With reference, now, to gas damper assembly GD1, damper housing 500 is operatively engaged with end member 400 and at least partially defines a damping chamber 502 on, along and/or within at least a portion of end member 400. Additionally, damper housing 500 secured on or along end member 400 such that forces and loads acting on one of upper and lower structural components USC and LSC can be transmitted or otherwise communicated to the other of upper and lower structural components USC and LSC at least partially through gas spring and gas damper assembly AS1.

Damper housing 500 can include or be otherwise formed from any combination of one or more components and/or devices. For example, damper housing 500 can include a housing sleeve 504 that can be at least partially formed from a sleeve wall 506 that extends axially between opposing ends 508 and 510. Sleeve wall 506 can extend peripherally about axis AX and can, in some case, have an approximately uniform wall thickness. Additionally, in some cases, sleeve wall 506 can have an approximately circular cross-sectional profile such that the inner sleeve is approximately cylindrical in overall shape. It will be appreciated, however, that other configurations and/or arrangements could alternately be used. Additionally, sleeve wall 506 includes an outer surface 512 that extends substantially-continuously around and along housing sleeve 504. In a preferred arrangement, sleeve wall 506 is dimensioned to be received within inner cavity 420 of end member 400 with outer surface 512 disposed in facing relation to inside surface 418 of inner side wall portion 414. Sleeve wall 506 can also include an inner surface 514 that extends substantially-continuously around and along housing sleeve 504 and can at least partially define damping chamber 502.

As discussed above, gas spring and gas damper assembly AS1 is displaceable, during use in normal operation, between extended and compressed conditions. During such displacement pressurized gas flow between spring chamber 202 and damping chamber 502 through elongated damping passage 448 generates pressurized gas damping. In cases in which the cross-sectional profile of the elongated damping passage can be endless or otherwise fully enclosed such that the corresponding elongated damping passage is substantially-entirely embedded within the end wall portion of the end member wall. In other cases, the cross-sectional profile of elongated damping passage 448 can be open or otherwise not fully enclosed. In such cases, damper housing 500 can include an end plate 516 that can extend across and at least partially enclose elongated damping passage 448.

As shown in FIGS. 7-9, 10 and 12, for example, end plate 516 can take the form of a substantially planar wall having an outer peripheral edge 518 and opposing side surfaces 520 and 522. End plate 516 can also include an inner peripheral edge 524 that at least partially defines a hole or opening 526 extending therethrough. In a preferred arrangement, hole 526 can be positioned approximately centrally on end plate 516 and can be dimensioned to receive and permit one or more components of gas damper assembly GD1 to extend through end wall portion 430, as discussed in greater detail below. End plate 516 can also include a passage or port 528 extending therethrough that is dimensioned for fluid communication with second end 452 of elongated damping passage 448. To aid in aligning port 528 with second end 452 of the elongated damping passage during assembly and maintaining such an alignment during use, end plate 516 can include one or more indexing or alignment features that operatively engage one or more other features and/or components of end member 400 and/or damper housing 500. For example, end member 400 could include one or more projections 456 or other indexing features that extend axially outwardly from along surface 434 of end wall portion 430. End plate 516 can include one or more indexing holes 530 that extend through the end plate and are cooperative with projections 456 to orient and align end plate 516 relative to end wall portion 430 of end member wall 406. Additionally, or as an alternative, one or more holes or openings could be included on or along the end wall portion of the end member wall, and one or more projections could be included on or along the end plate. In any case, cooperative engagement of alignment or indexing features (e.g., projections 456) of end member 400 with alignment or indexing features (e.g., indexing holes 530) of end plate 516 can aid in assembly and assist in ensuring that port 528 and second end 452 of elongated damping passage 448 are at least approximately aligned and in fluid communication with one another.

It will be appreciated that end plate 516 can be secured on or along surface 434 of end wall portion 430 of end member wall 406 in any suitable manner and/or through the use of any combination of one or more features and/or components. For example, end plate 516 can be disposed between end member 400 and housing sleeve 504 such that surface 520 is disposed in facing relation with surface 434 of end wall portion 430. In such case, end 508 of housing sleeve 504 can abuttingly engage the end plate along outer peripheral edge 518 to retain the end plate in position relative to the end wall portion of the end member wall.

Additionally, or in the alternative, damper housing 500 can include a support ring 532 that can be secured on or along end wall portion 430 of end member wall 406 in operative engagement with end plate 516 to at least partially retain the end plate on or along surface 434 of the end wall portion. Support ring 532 can include an annular wall with a first outer surface portion 534 having a first cross-sectional size or dimension that is cooperative with passage 444 in end wall portion 430 of end member wall 406. Support ring 532 can also include a second outer surface portion 536 that is spaced axially from the first outer surface portion and has a second cross-sectional size or dimension that is greater than the first cross-sectional size or dimension of first outer surface portion 534 such that a shoulder surface portion 538 extends radially therebetween.

Support ring 532 can be installed on end wall portion 430 of end member wall 406 with first outer surface portion 534 at least partially disposed within passage 444 and can be secured on the end wall portion in any suitable manner, such as by way of a threaded connection, a press-fit connection and/or a flowed-material joint, for example. In such case, support ring 532 can at least partially secure end plate 516 on or along end wall portion 430. For example, first outer surface portion 534 can extend through opening 526 in end plate 516 such that shoulder surface portion 538 can abuttingly engage the end plate along inner peripheral edge 524. Support ring 532 can also include an inner surface 540 that at least partially defines a passage or opening 542 extending through support ring 532 between opposing end surfaces 544 and 546. In an installed condition, passage 542 dimensioned to receive and permit one or more components of gas damper assembly GD1 to extend through end wall portion 430, as discussed in greater detail below.

In cases in which the cross-sectional profile of passage surface 454 is open or otherwise not fully enclosed, it may be desirable substantially inhibit or at least reduce pressurized gas transfer between adjacent rings or other sections of elongated damping passage 448 along surface 434. It will be appreciated that inhibiting or at least reducing such undesirable pressurized gas transfer may promote pressurized gas flow along elongated damping passage 448 and, thus, provide improved gas damping performance. It will be appreciated that such undesirable pressurized gas transfer can be inhibited or otherwise reduced in any suitable manner and through the use of any suitable components, features and/or elements. As one example, one or more sealing elements could be disposed between surface 434 of end wall portion 430 and surface 520 of end plate 516 to at least partially form a substantially fluid-tight seal therebetween. As another example, a flowed material joint could be formed between the surface of the end wall portion and the surface of the end plate. Such sealing arrangements are collectively schematically represented in FIG. 8 by dashed lines 548.

Figure 9A:
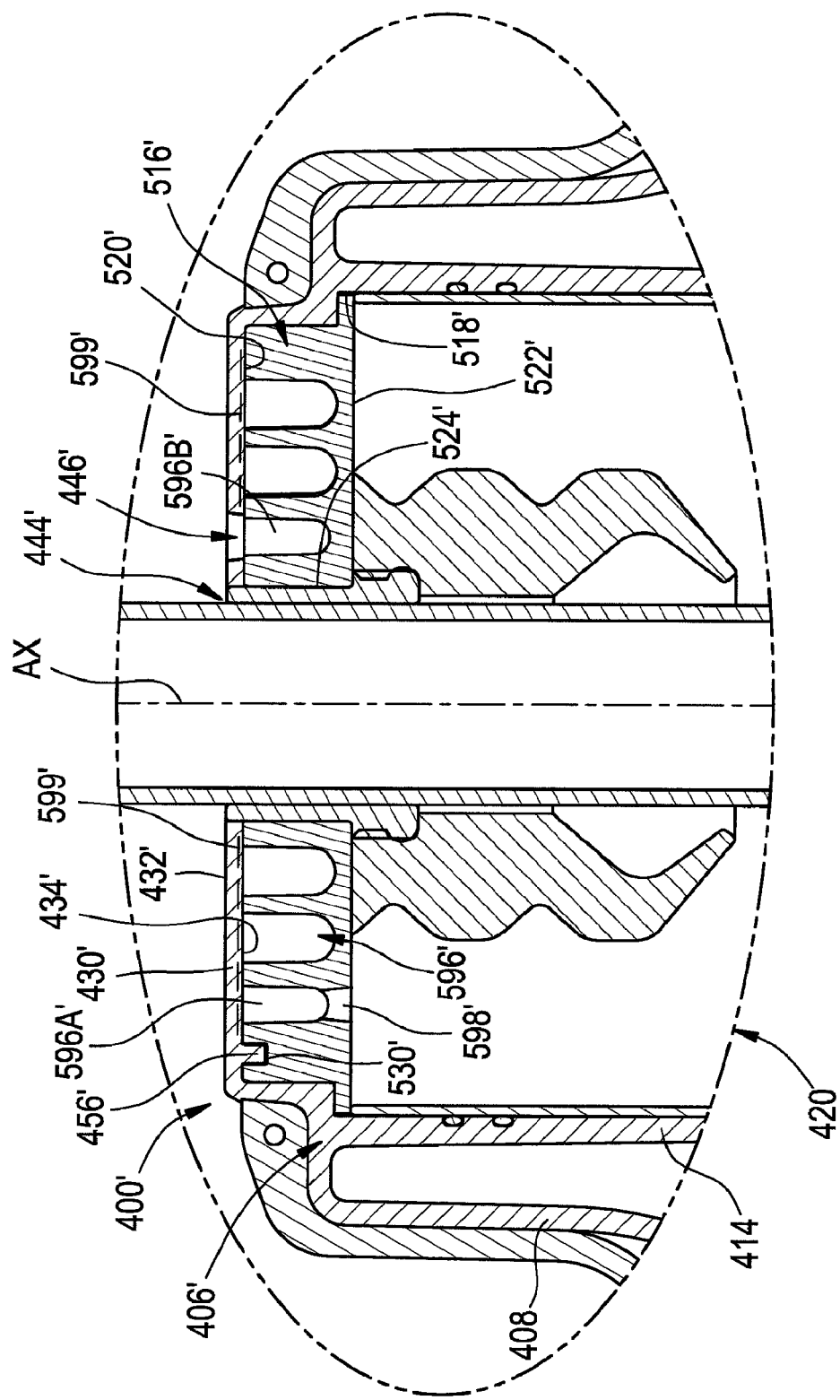
FIG. 9A is an alternate construction of the portion, shown in FIG. 8, of the exemplary gas spring and gas damper assembly in FIGS. 2-9.

As described above, a gas spring and gas damper assembly in accordance with the subject matter of the present disclosure can include an elongated damping passage extending between and fluidically connecting the spring chamber and one or more damping chambers or damping chamber portions. Another example of a suitable construction is shown in FIG. 9A as including an end member 400' and an end plate 516'. It will be appreciated that end member 400' and end plate 516' represent an alternate construction to that shown and described above in connection with end member 400 and end plate 516 in FIGS. 7-9, 10 and 12-18. It will be appreciated that the foregoing description of end member 400 and end plate 516 are broadly applicable to end member 400' and end plate 516' unless set forth and described differently herein. Additionally, unless otherwise stated, end plate 516' can be assembled together with other parts and/or components of damper housing 500 as has been described herein in connection with end plate 516.

End member 400' can include an end member wall 406' with an end wall portion 430' that can extend across and/or between any combination of one or more of outer side wall portion 408, inner side wall portion 414 and/or support wall portions 424. End wall portion 430' can be oriented transverse to axis AX and can at least partially form a closed end of inner cavity 420 of the end member. Additionally, end wall portion 430' can include opposing surfaces 432' and 434'. End member wall 406' of end member 400' can include an opening or passage 444' extending through end wall portion 430' between surfaces 432' and 434'. In a preferred arrangement, passage 444' can be oriented in approximately co-axial alignment with axis AX. End member 400' can also include a passage or port 446' extending through end wall portion 430' of end member wall 406'. In a preferred arrangement, passage 446' is disposed radially outward of opening 444'. End member 400' can further include one or more projections 456' or other indexing features operative to engage one or more corresponding indexing or alignment features of end plate 516'.

End plate 516' includes an outer peripheral edge 518' and opposing side surfaces 520' and 522'. End plate 516' can also include an inner peripheral edge 524' that at least partially defines a hole or opening (not numbered) extending therethrough. In a preferred arrangement, the hole can be positioned approximately centrally on end plate 516' and can be dimensioned to receive and permit one or more components of gas damper assembly GD1 to extend through end wall portion 430'. To aid in aligning end plate 516' with one or more corresponding features of end member 400', end plate 516' can include one or more indexing or alignment features, such as one or more indexing holes 530' that extend at least partially into the end plate and are cooperative with projections 456' to orient and align end plate 516' relative to end wall portion 430' of end member wall 406'.

It will be recognized and appreciated that end wall portion 430' and end plate 516' differ from end wall portion 430 and end plate 516 in that an elongated damping passage 596' extends into, through or otherwise along at least a portion of end plate 516' rather than on or along end wall portion 430'. Additionally, end plate 516' includes a passage or port 598' extending through the end plate. In a preferred arrangement, elongated damping passage 596' has a first end 596A' disposed in fluid communication with port 598' and a second end 596B' disposed in fluid communication with port 446'. Additionally, it will be appreciated that elongated damping passage 596' can be of any suitable shape, form, configuration and/or arrangement. In a preferred arrangement, elongated damping passage 596' can have a spiral-like or similar configuration, such as has been described above in detail in connection with elongated damping passage 448.

In some cases, the cross-sectional profile of elongated damping passage 596' can be endless or otherwise fully enclosed. In such cases, the elongated damping passage can be substantially-entirely embedded within the end plate. In other cases, the cross-sectional profile of elongated damping passage 596' can be open (i.e., not fully enclosed). In such cases, the corresponding elongated damping passage can be open along one or more surfaces of end plate 516', such as has been described above in detail in connection with elongated damping passage 448. In such cases, it may be desirable substantially inhibit or at least reduce pressurized gas transfer between adjacent rings or other sections of elongated damping passage 596' along surface 520', such as has been described above. It will be appreciated that such undesirable pressurized gas transfer can be inhibited or otherwise reduced in any suitable manner and through the use of any suitable components, features and/or elements. As one example, one or more sealing elements could be disposed between surface 434' of end wall portion 430' and surface 520' of end plate 516' to at least partially form a substantially fluid-tight seal therebetween. As another example, a flowed material joint could be formed between the surface of the end wall portion and the surface of the end plate. Such sealing arrangements are collectively schematically represented in FIG. 9A by dashed lines 599'.

With reference, now, to FIGS. 2-7, 9, 11 and 19-22, damper housing 500 can also include an end cap 550 operatively disposed along end 510 of housing sleeve 504 and secured thereto such that gas spring and gas damper assembly AS1 can function to transfer forces and loads between upper and lower structural components USC and LSC, as discussed above. End cap 550 can be configured to secure gas spring and gas damper assembly AS1 on or along an associated structural component, such as lower structural component LSC, for example. It will be appreciated any suitable combination of features, elements and/or components can be used to form such a connection. As one example, the end cap can include a spherical bearing or other similar component operatively connected between the end cap mount and the associated structural component (e.g., lower structural component LSC). As another example, end cap 550 can include an end cap wall 552 that includes a passage (not numbered) formed therethrough generally transverse to axis AX. End cap wall 552 can function as an outer support element and an inner support element 554 can be disposed within the passage. An elastomeric connector element 556 can be permanently attached (i.e., inseparable without damage, destruction or material alteration of at least one of the component parts) between end cap wall 552 and inner support element 554 to form an elastomeric bushing 558 suitable for pivotally mounting assembly AS1 on or along the associated structural component.

End cap wall 552 can include a base wall portion 560 oriented approximately transverse to axis AX and a side wall portion 562 that extends axially from along base wall portion 560 toward a distal edge 564. Base wall portion 560 can have a base surface 566 and side wall portion 562 can have an inner side surface 568. Base wall portion 560 and side wall portion 562 can at least partially define an end cap cavity 570 that is dimensioned to receive end 510 of housing sleeve 504 with outer surface 512 disposed in facing relation to inner side surface 568 of side wall portion 562. In some cases, damper housing 500 can also include an end plate 572 in the form of a substantially planar wall having an outer peripheral edge 574 and opposing side surfaces 576 and 578. It will be appreciated that end plate 572 can be secured on or along end cap 550 in any suitable manner and/or through the use of any combination of one or more features and/or components. For example, end plate 572 can be disposed between end cap 550 and housing sleeve 504 such that side surface 578 is disposed in facing relation with base surface 566 of end cap wall 552. In such case, end 510 of housing sleeve 504 can abuttingly engage end plate 572 along outer peripheral edge 574 to retain the end plate in position relative to end cap wall 552 of the end cap.

In a preferred arrangement, spring chamber 202 and damping chamber 502 are in fluid communication with one another through one of elongated damping passages 448 and 596' together with any associated ports or passages. As such, it may be desirable to maintain spring chamber 202 and damping chamber 502 in fluidic isolation with respect to an external atmosphere ATM. In such cases, gas damper assembly GD1 substantially fluid-tight seals can be formed in any suitable manner between end member 400 and components of the gas damper assembly and/or between two or more components of gas damper assembly GD1. For example, one or more sealing elements 580 can be fluidically disposed between inner side wall portion 414 of end member wall 406 and housing sleeve 504 such that a substantially fluid-tight seal is formed therebetween. It will be appreciated that sealing elements 580 can be secured on, along or otherwise between such components in any suitable manner. For example, one or more annular grooves 582 can extend into inner side wall portion 414 from along inside surface 418 thereof that are dimensioned to receive and retain the sealing elements. As another example, one or more sealing elements 584 can be fluidically disposed between side wall portion 562 of end cap wall 552 and housing sleeve 504 such that a substantially fluid-tight seal is formed therebetween. It will be appreciated that sealing elements 584 can be secured on, along or otherwise between such components in any suitable manner. For example, one or more annular grooves 586 can extend into side wall portion 562 from along inner side surface 568 thereof that are dimensioned to receive and retain the sealing elements.

Additionally, end cap wall 552 can include one or more passages 588 formed therethrough. Passages 588 can be oriented in approximate alignment with axis AX. Additionally, in a preferred arrangement, passages 588 can be disposed in approximate alignment with securement devices 428 of boss wall portions 426 on end member 400. In such case, securement devices 590 (e.g., threaded fasteners) can extend through passages 588 and into engagement with securement devices 428 to attach and secure end cap 550 on or along at least one of end member 400 and housing sleeve 504.

In some cases, one or more jounce bumpers can be included to inhibit contact between one or more features and/or components of assembly AS1. For example, a jounce bumper 592 can be disposed within a portion of damping chamber 502, such as by securement on or along second outer surface portion 536 of support ring 532, for example, to substantially inhibit contact between a component of damper rod assembly 600 and one or more of end member 400, end plate 516 and support ring 532 during a full rebound condition of assembly AS1. Additionally, or in the alternative, a jounce bumper 594 can be disposed within a portion of damping chamber 502, such as by securement on or along a component of damper rod assembly 600, for example, to substantially inhibit contact between components of the damper rod assembly and end cap 550 and/or end plate 572 during a full jounce condition of assembly AS1.

Damper rod assembly 600 includes an elongated damper rod 602 and a damper piston 604. Damper rod 602 extends longitudinally from an end 606 to an end 608. End 606 of damper rod 602 can include a securement feature dimensioned for operatively connecting the damper rod on or along end member 300. As one example, damper rod 602 can include one or more helical threads disposed along end 606. Damper piston 604 can be disposed along end 608 of damper rod 602 and can be attached or otherwise connected thereto in any suitable manner. For example, the damper piston could be integrally formed with the damper rod. As another example, end 608 of damper rod 602 could include a securement feature, such as one or more helical threads, for example. In such case, damper piston 604 could be provided separately and could include a passage or hole (not numbered) into which end 608 of damper rod 602 can be secured. In a preferred arrangement, a blind passage or hole can be used to assist in maintaining fluidic isolation across damper piston 604.

In an assembled condition, damper rod assembly 600 is disposed along gas spring assembly GS1 such that damper piston 604 is received within damping chamber 502 of damper housing 500. In such case, damper rod 602 can extend through the passage 542 formed by support ring 532 and such that end 606 of damper rod 602 is disposed out of damping chamber 502. In such cases, support ring 532 can function as a bearing or bushing element operative to reduce frictional engagement on or along damper rod 602. In some cases, a sealing element (not shown) and/or a wear bushing (not shown) can optionally be included on or along the support ring.

Additionally, it will be appreciated that damper piston 604 separates damping chamber 502 into damping chamber portions 502A and 502B disposed along opposing sides of the damper piston. In some cases, a sealing element 610 can be disposed between an outer peripheral wall 612 of damper piston 604 and inner surface 514 of housing sleeve 504. It will be recognized, however, that in some cases significant frictional forces may be generated by the sealing arrangements described above in connection with the interface between damper piston 604 and inner surface 514 as well as in connection with the interface between an outer surface 614 of damper rod 602 and support ring 532. In some cases, it may be desirable to avoid or at least reduce such frictional forces (or for other reasons) by forgoing the use of sealing elements along either or both interfaces. In such cases, one or more friction reducing bushings or wear bands can, optionally, be disposed therebetween.

Damper rod 602 is shown in FIGS. 7-9, 9A and 9B as taking the form of a hollow rod or tube having a rod wall 616 that includes an inner surface 618 that at least partially defines a tube passage 620 extending lengthwise through damper rod 602. In a preferred arrangement, one or more ports or passages 622 (FIGS. 7 and 9) can be disposed along end 606 of damper rod 602 such that tube passage 620 is disposed in fluid communication with spring chamber 202 through ports 622. Additionally, or in the alternative, ports or passages 624 (FIG. 9B) can extend through rod wall 616 such that tube passage 620 is disposed in fluid communication with spring chamber 202 through ports 624. Furthermore, in a preferred arrangement, one or more ports or passages 626 can be disposed along end 608 of the damper rod and/or extend through damper piston 604 such that tube passage 620 is disposed in fluid communication with damping chamber portion 502B through ports 624. In such case, ports 622 and/or 624 together with tube passage 620 and ports 626 can form a return gas flow passage as pressurized gas flows through into or out of damping chamber portion 502A during dynamic use in operation of gas spring and gas damper assembly AS1.

Figure 9B:
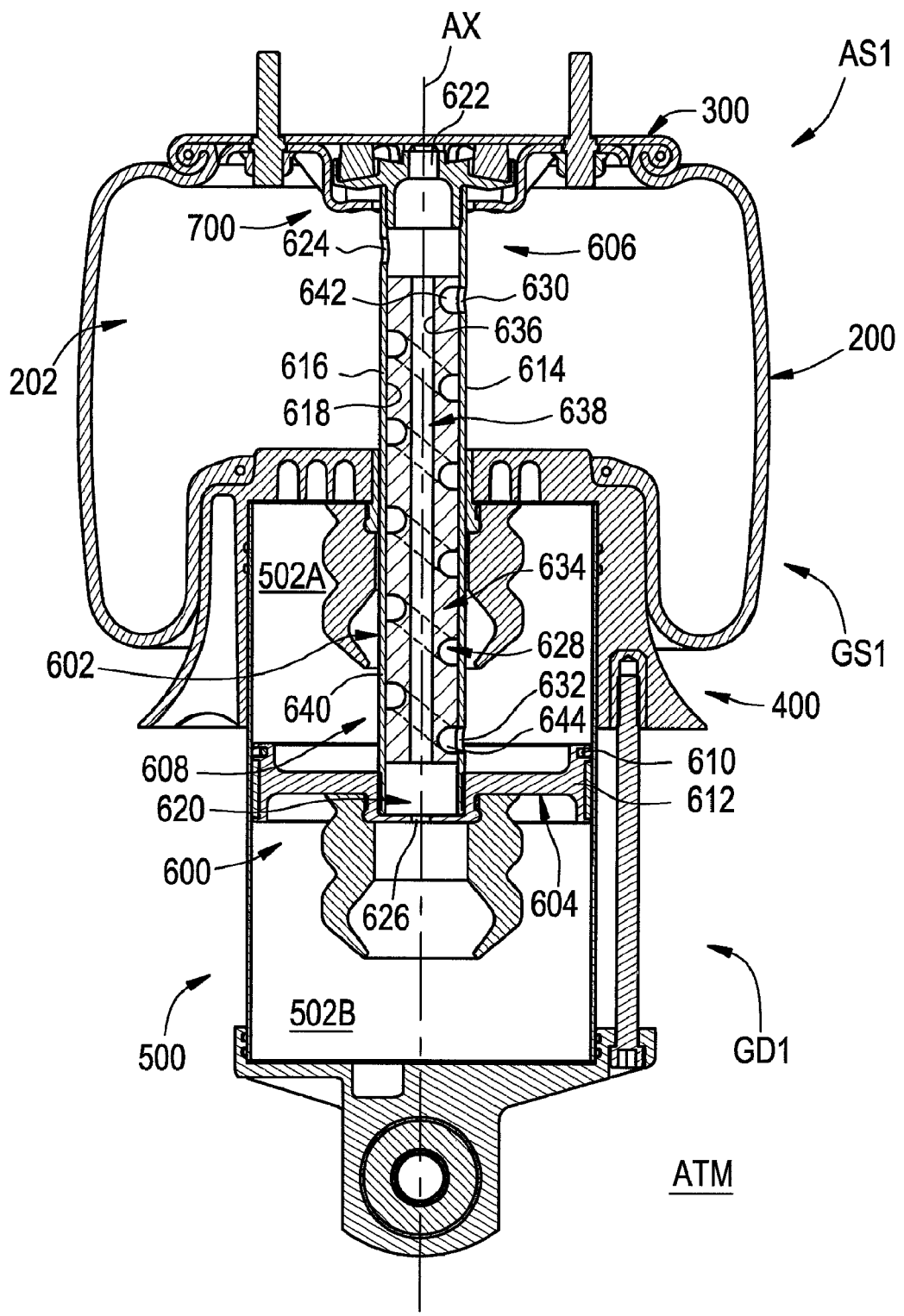
FIG. 9B is another alternate construction of the exemplary gas spring and gas damper assembly shown in FIGS. 2-9.
Figure 10:
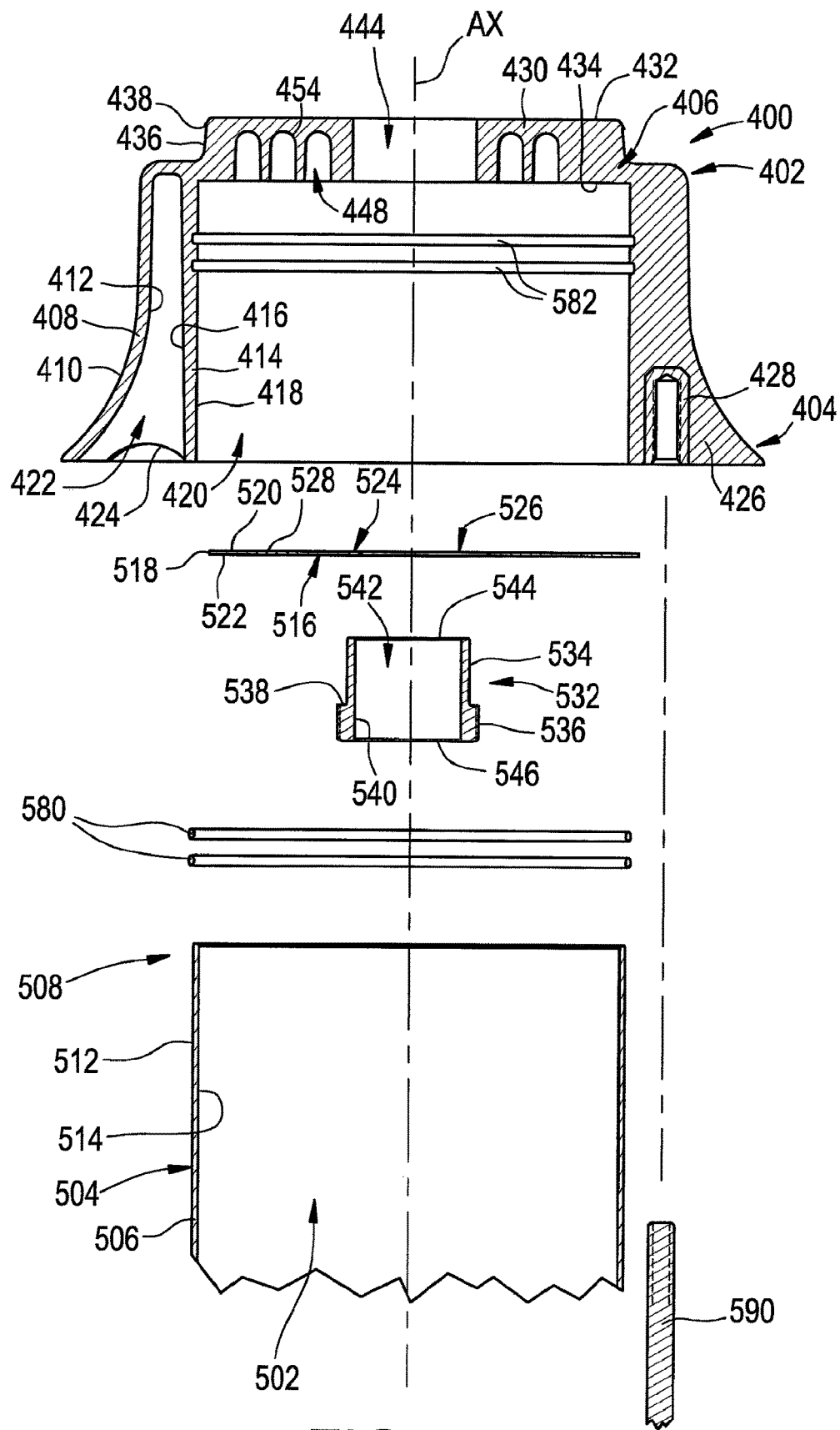
FIG. 10 is an exploded view, in partial cross section, of one portion of the gas spring and gas damper assembly in FIGS. 2-9.
Figure 11:
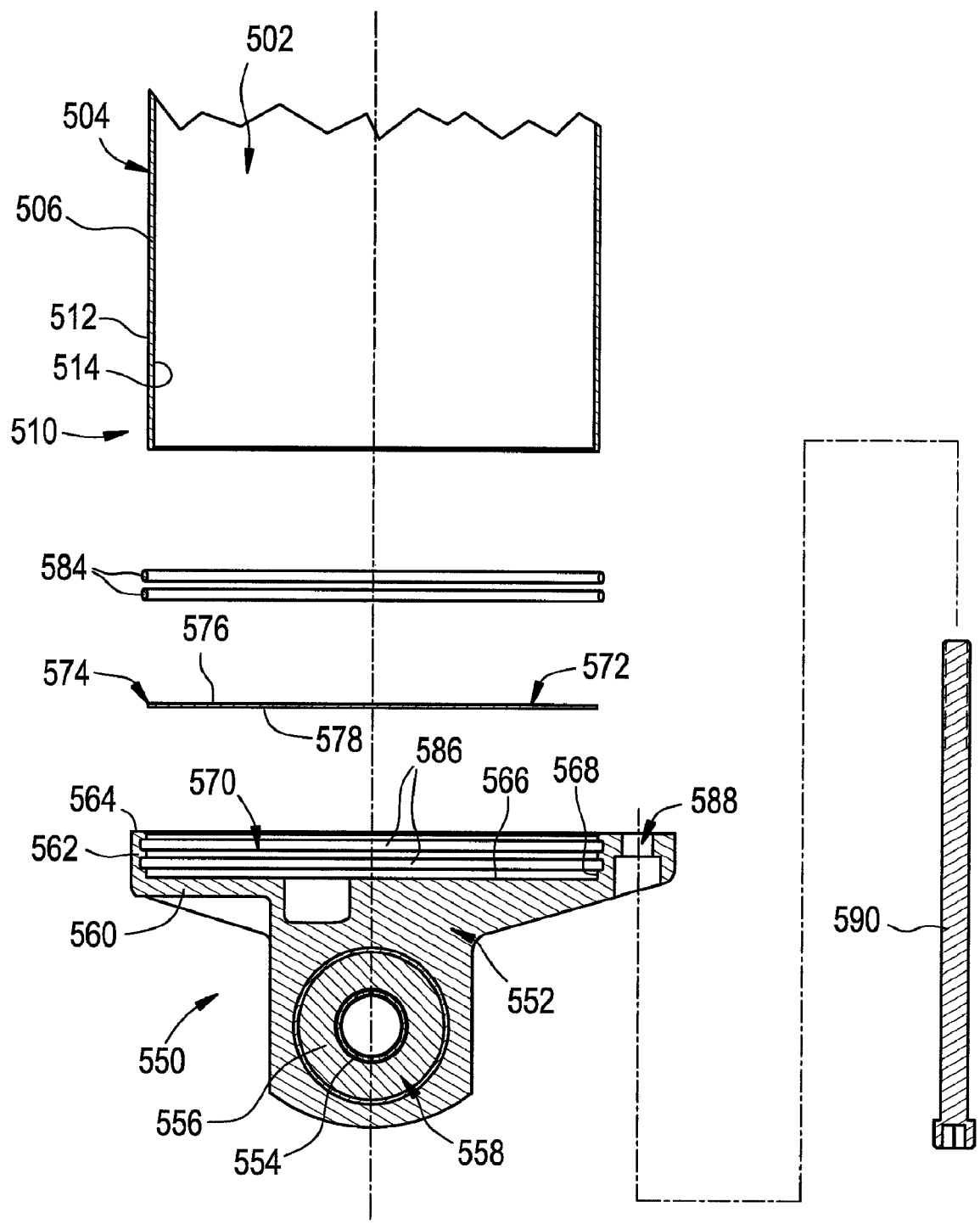
FIG. 11 is an exploded view, in partial cross section, of another portion of the gas spring and gas damper assembly in FIGS. 2-10.
Figure 12:
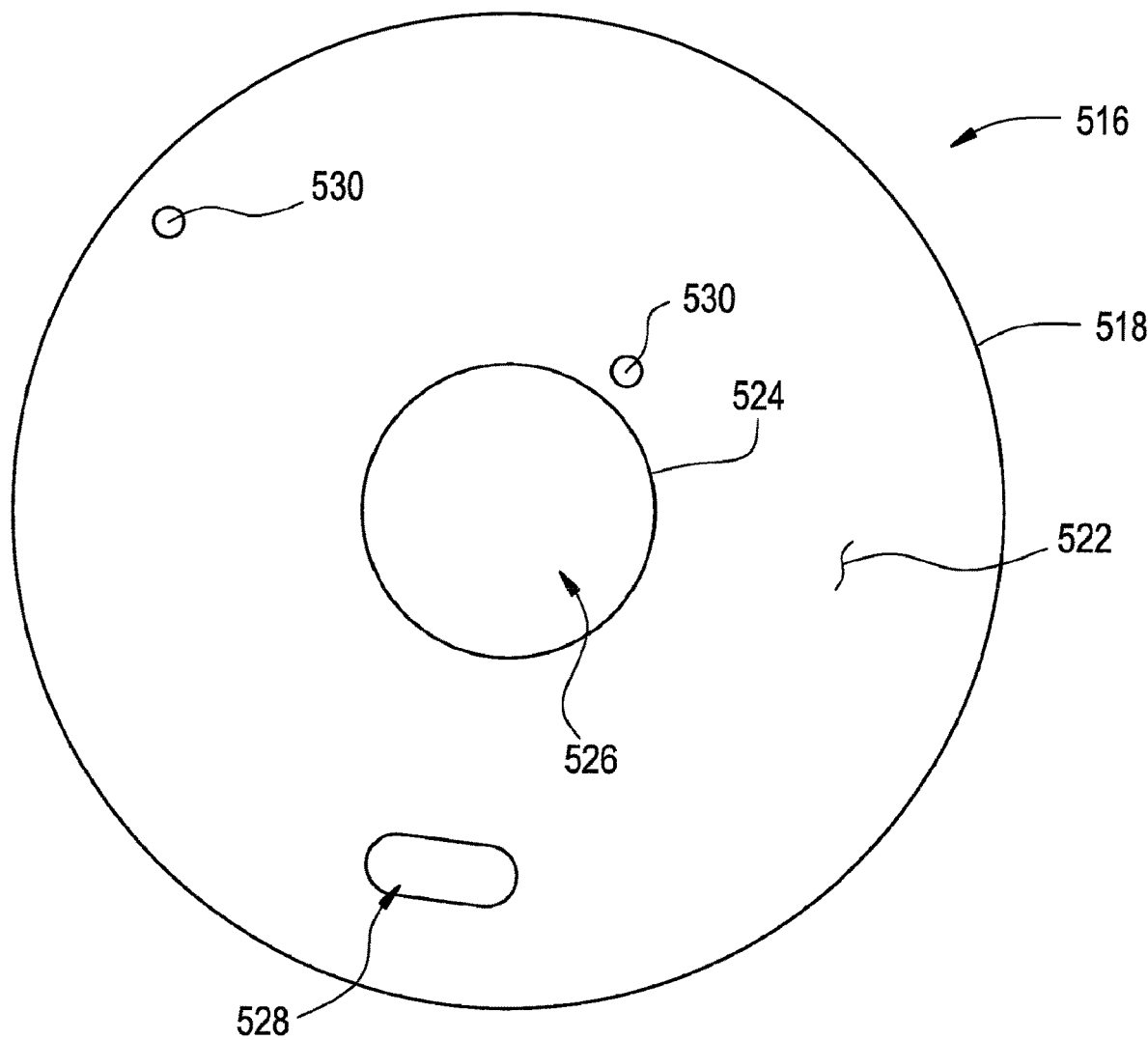
FIG. 12 is a top plan view of one example of an end plate of the gas spring and gas damper assembly in FIGS. 2-11.
Figure 13:
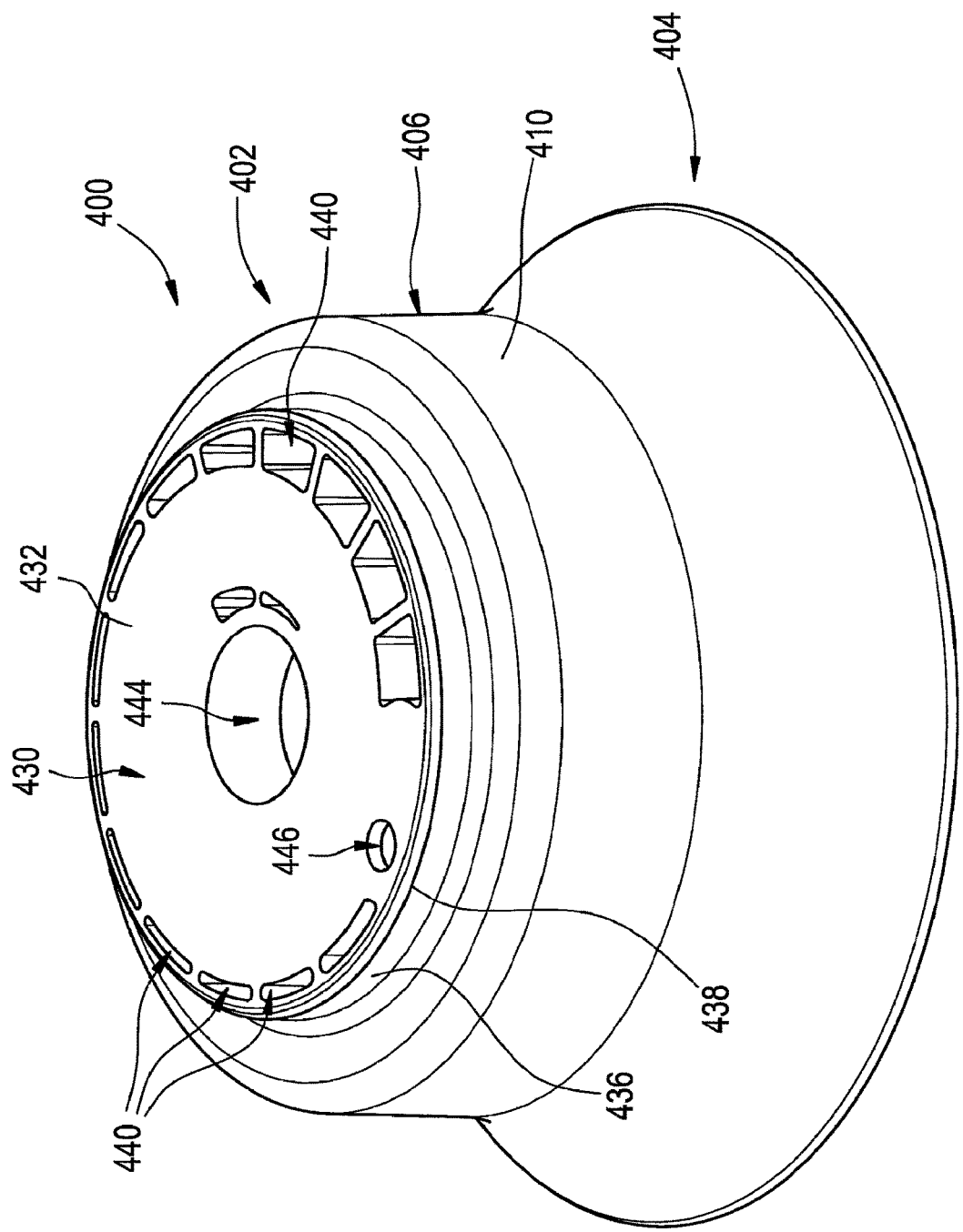
FIG. 13 is a top perspective view of one example of an end member in accordance with the subject matter of the present disclosure, such as is shown in FIGS. 2-11.
Figure 14:
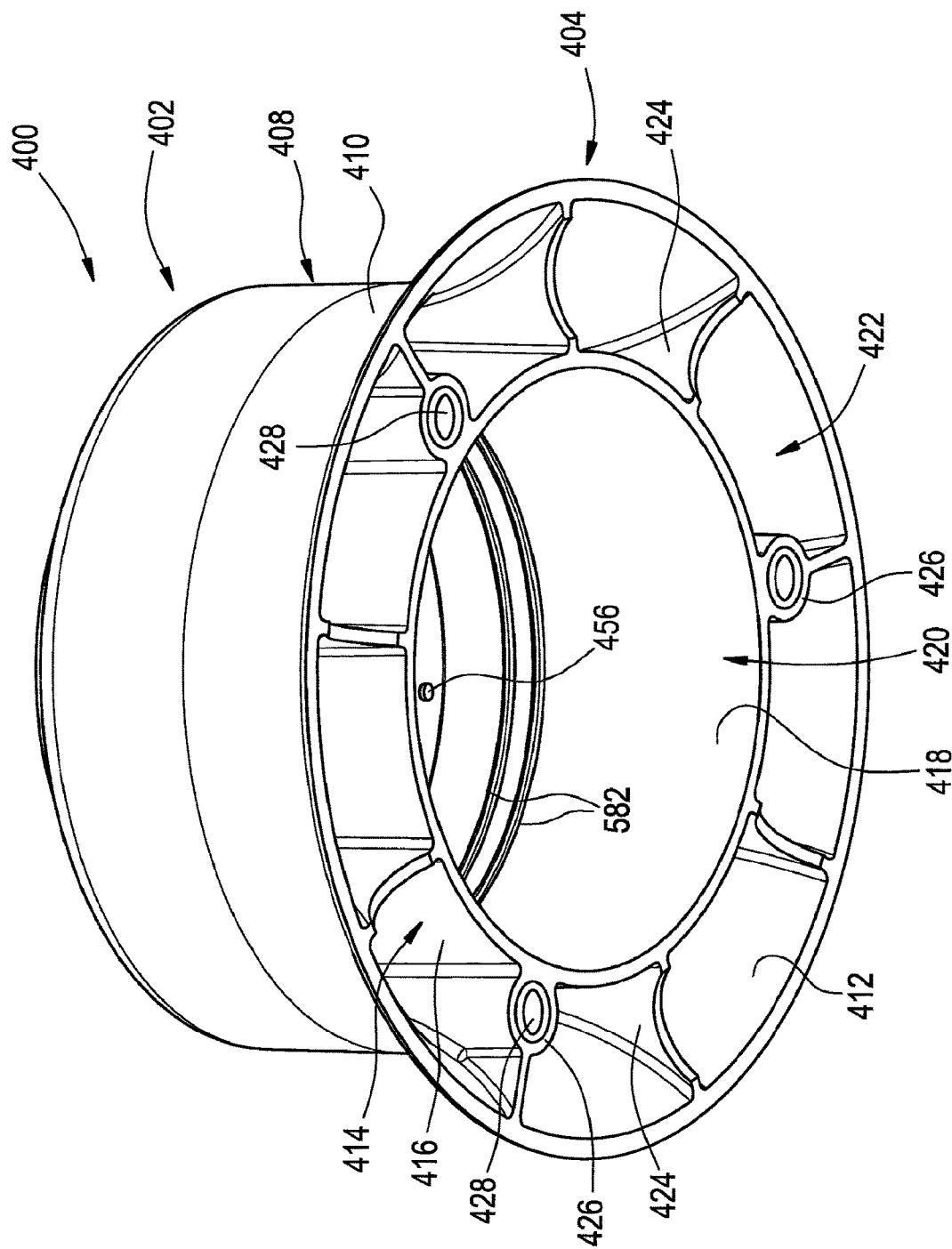
FIG. 14 is a bottom perspective view of the exemplary end member in FIG. 13.
Figure 15:
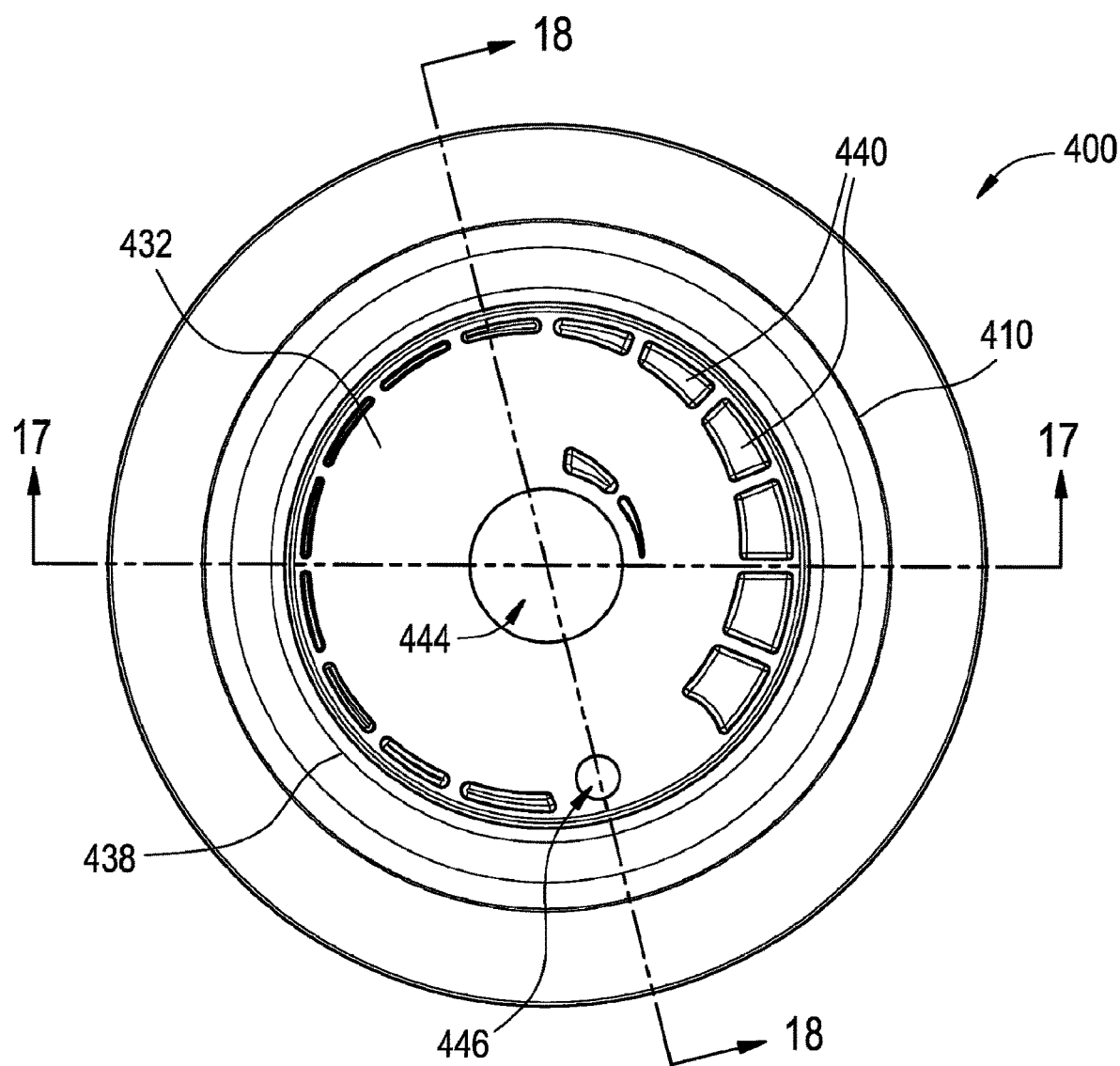
FIG. 15 is a top plan view of the exemplary end member in FIGS. 13 and 14.
Figure 16:
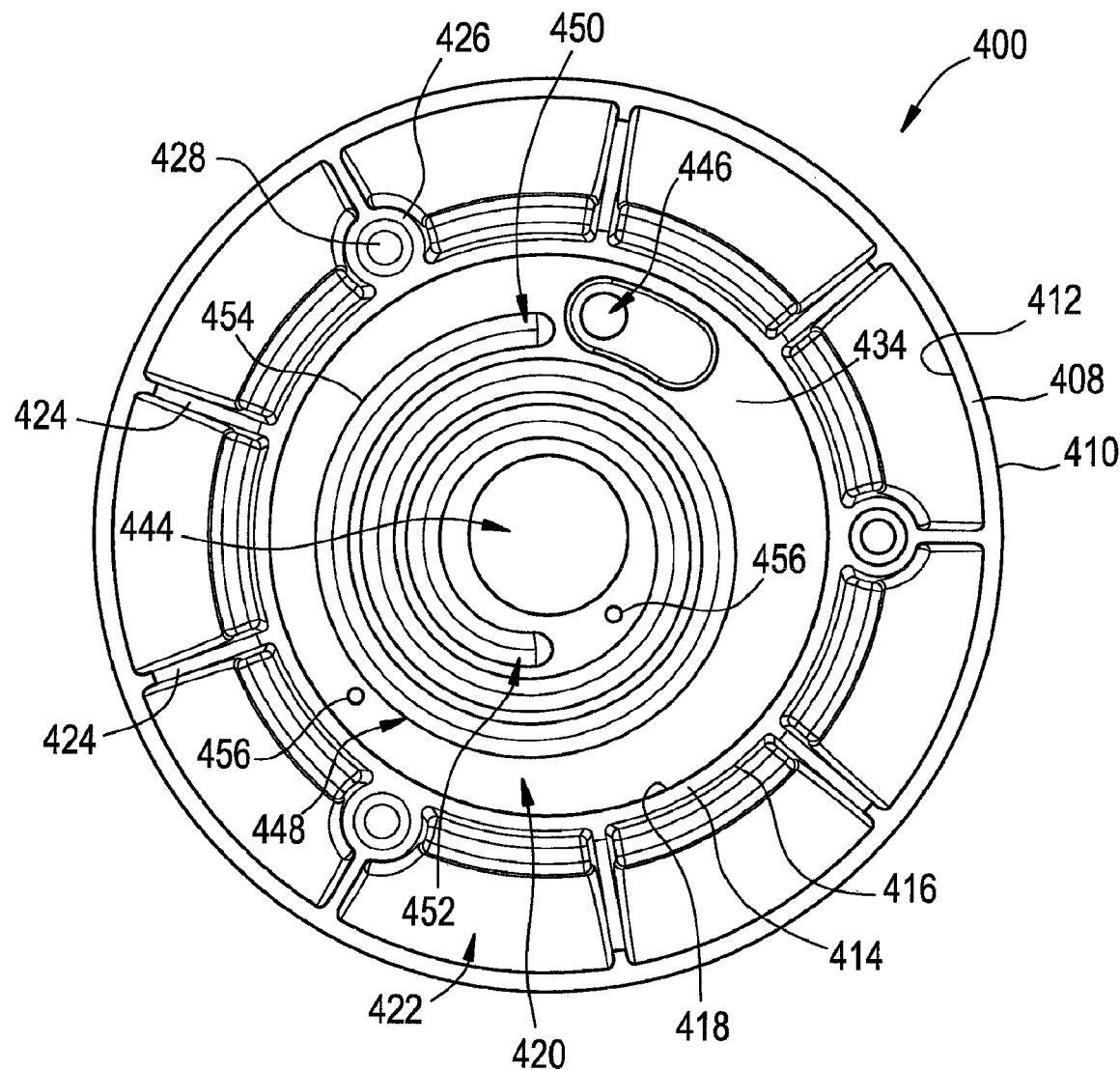
FIG. 16 is a bottom plan view of the exemplary end member in FIGS. 13-15.
Figure 17:
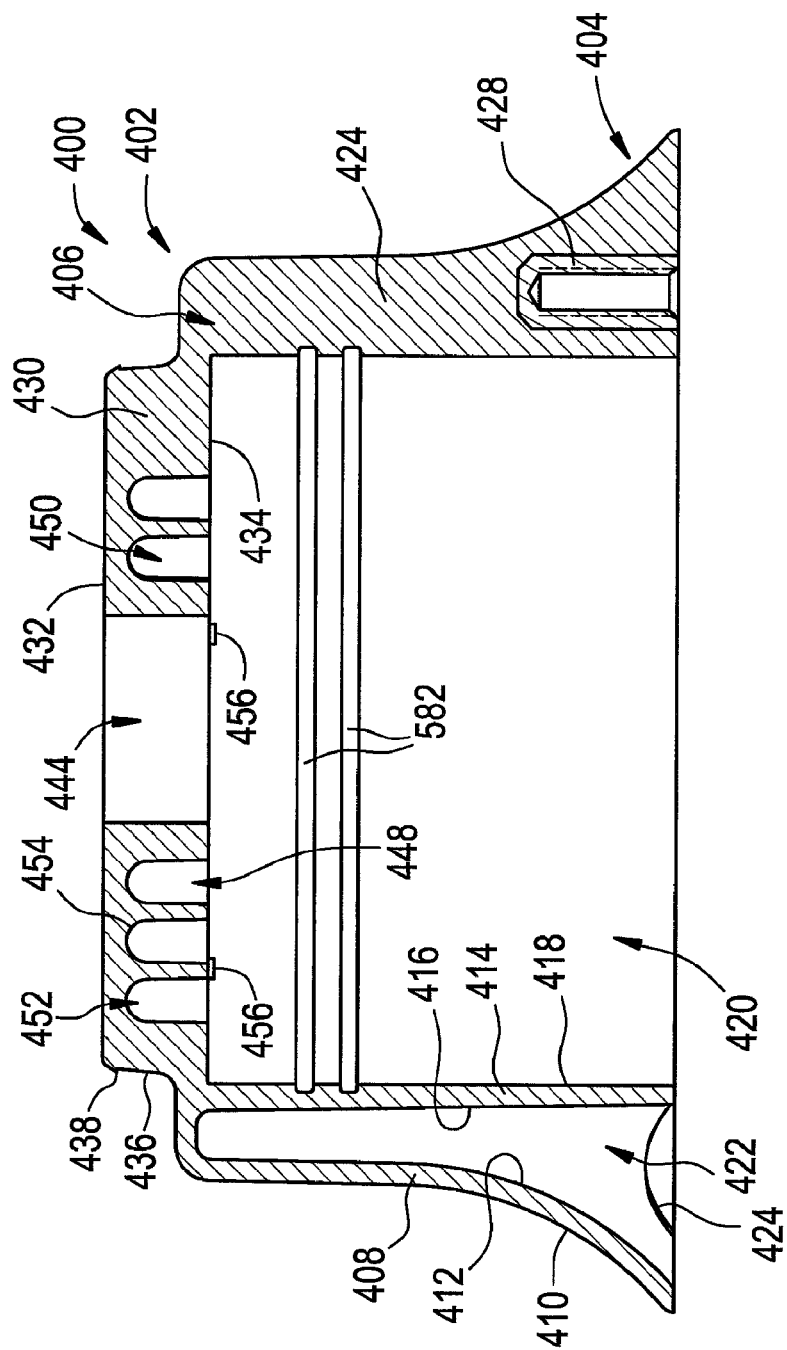
FIG. 17 is a cross-section side view of the exemplary end member in FIGS. 13-16 taken from along line 17-17 in FIG. 15.
Figure 18:
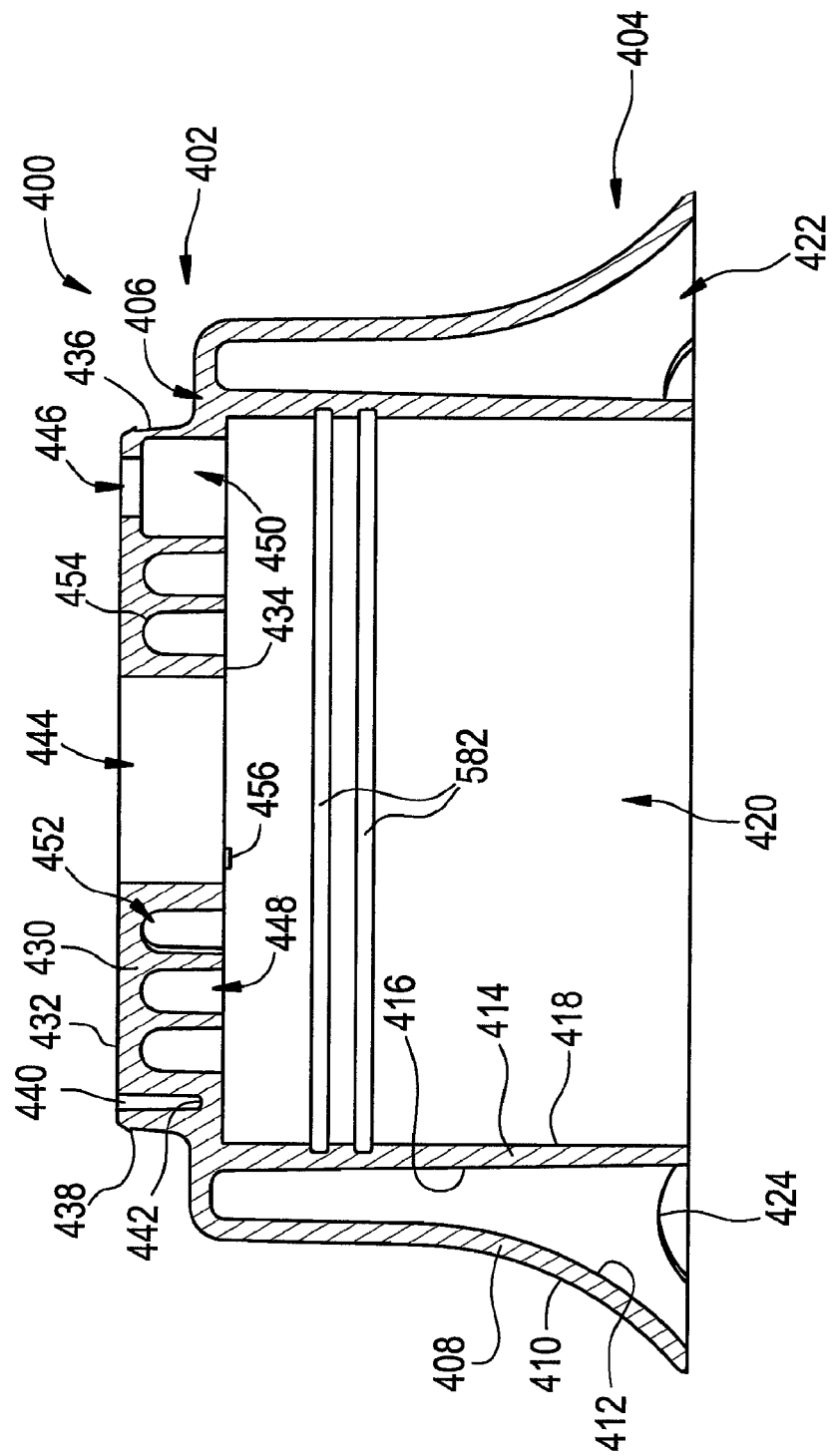
FIG. 18 is a cross-section side view of the exemplary end member in FIGS. 13-17 taken from along line 18-18 in FIG. 15.
Figure 19:
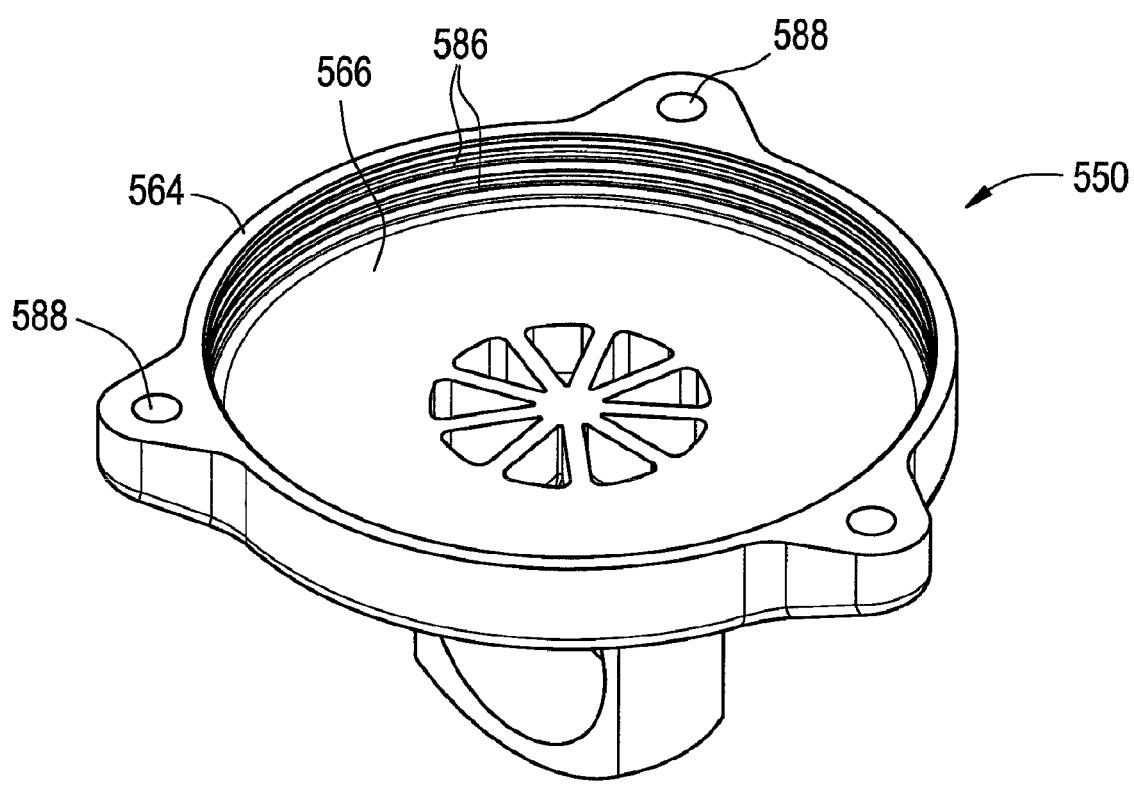
FIG. 19 is a top perspective view of one example of an end cap of an exemplary damper housing of a gas spring and gas damper assembly in accordance with the subject matter of the present disclosure, such as is shown in FIGS. 2-11.
Figure 20:
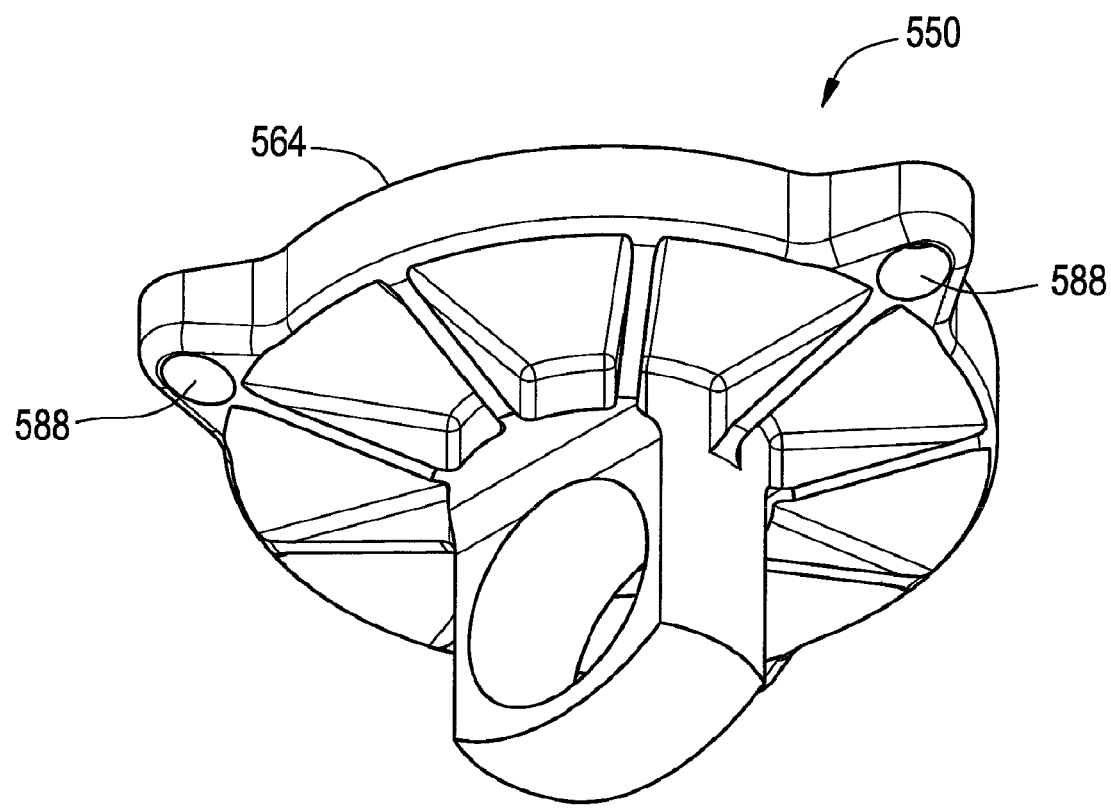
FIG. 20 is a bottom perspective view of the exemplary end cap in FIG. 19.
Figure 21:
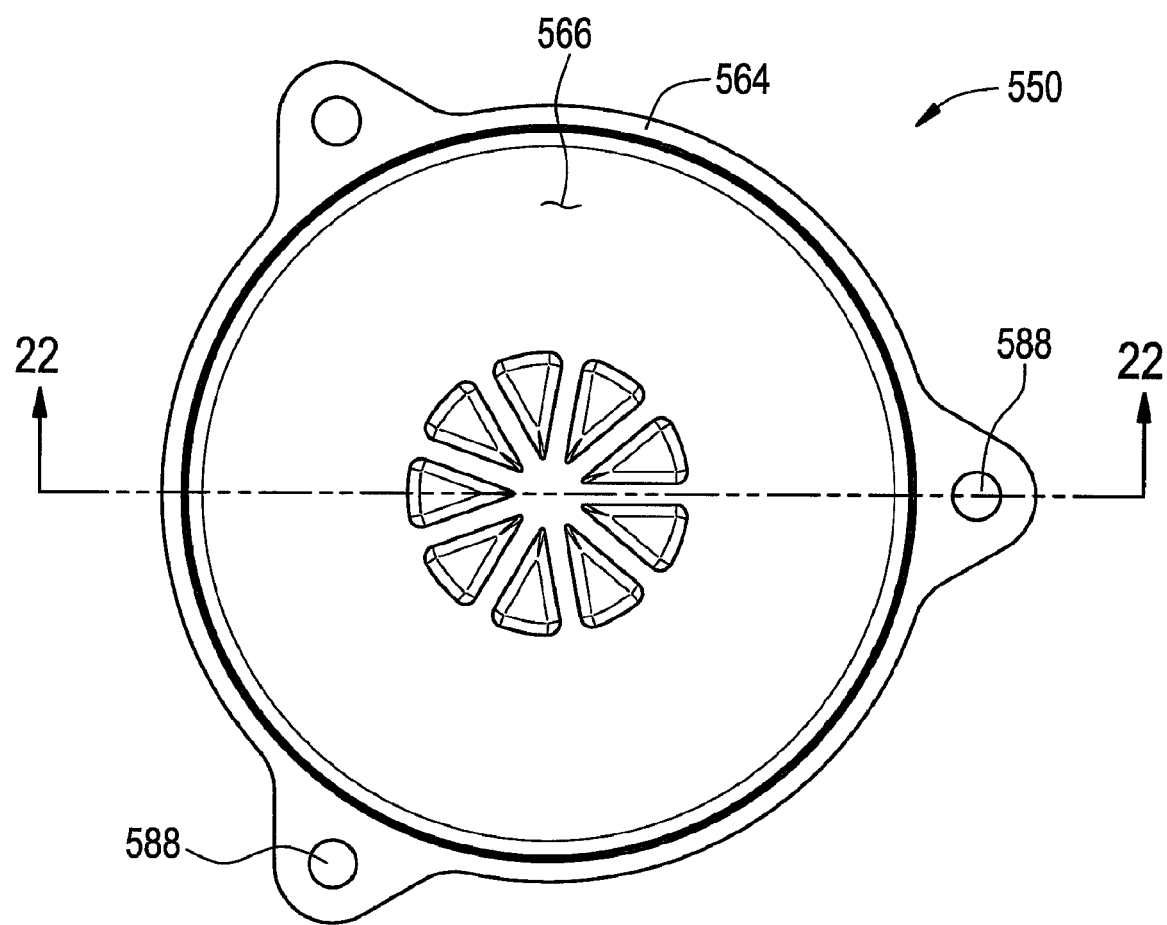
FIG. 21 is a top plan view of the exemplary end cap in FIGS. 19 and 20.
Figure 22:
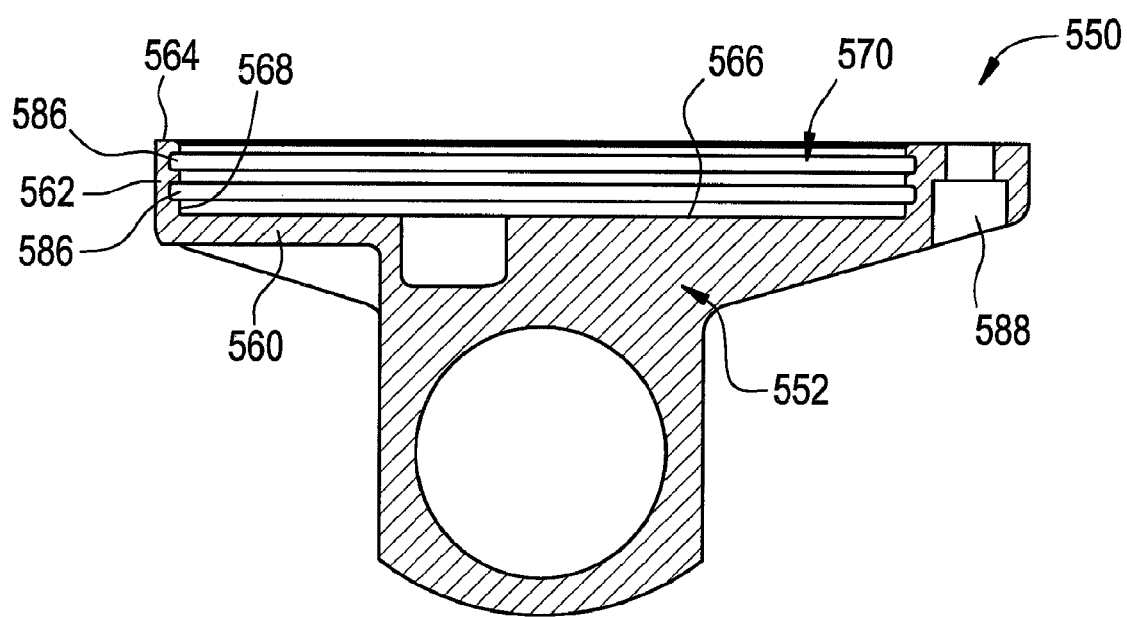
FIG. 22 is a cross-section side view of the exemplary end cap in FIGS. 19-21 taken from along line 22-22 in FIG. 21.

As described above, a gas spring and gas damper assembly in accordance with the subject matter of the present disclosure can include an elongated damping passage extending between and fluidically connecting the spring chamber and one or more damping chambers or damping chamber portions. A gas spring and gas damper in accordance with the subject matter of the present disclosure can include an additional, or as another alternate construction, an elongated damping passage 628 that can be at least partially formed within tube passage 620. As shown in FIG. 9B, damper rod 602 can, optionally, include one or more ports or passages 630 disposed toward end 606 and one or more ports or passages 632 disposed toward end 608. A damping passage body 634 can be disposed within tube passage 620, and can include an inside surface 636 that defines an elongated insert passage 638 extending lengthwise through the damping passage body. An outside surface 640 extends along damping passage body 634 and is dimensioned for receipt within tube passage 620. A helical channel (not separately numbered) extends radially inward into damping passage body 634 from along outside surface 640 between a first channel end 642 disposed in fluid communication with port 630 and a second channel end 644 disposed in fluid communication with port 632. It will be appreciated that damping passage body 634 can be retained on or along tube passage 620 in any manner suitable for retaining the first and second channel ends in fluid communication with ports 630 and 632, respectively.

During dynamic use in operation, pressurized gas transfer through elongated damping passage 628 can provide pressurized gas damping in addition to pressurized gas damping associated with elongated damping passage 448 or 596', such as may be useful for generating pressurized gas damping to dissipate kinetic energy from vibrations or other inputs acting on the gas spring and gas damper assembly at two different natural frequencies or two different targeted natural frequency ranges. Non-limiting examples of targeted frequency ranges can include vibrations from 1-4 Hz, vibrations from 8-12 Hz and vibrations from 15-25 Hz.

It will be appreciated, that the movement of associated structural components relative to one another, as described above, can be due to variations in load conditions and/or result from road inputs and/or other impact conditions (e.g., jounce conditions), as is well understood by those of skill in the art. Additionally, it will be recognized and appreciated that gas spring and gas damper assemblies, such as assembly AS1, for example, and/or components thereof will typically move relative to one another in a curvilinear, rotational, arcuate, angular or other non-linear manner. As such, a pivotal mount, such as elastomeric bushing 558, for example, can be used to permit some movement of gas spring and gas damper assembly AS1 relative to lower structural component LSC. In many cases, a gas spring is also capable of accommodating non-linear movement of the upper and lower structural components relative to one another. However, in constructions in which an elongated damping rod or other similar component extends through the spring chamber and operatively connects the end members of the gas spring, a mounting assembly can be included that permits pivotal motion between at least one of the end members and the elongated damping rod to accommodate the non-linear movement of the associated structural components relative to one another.

One example of an end mount assembly 700 is shown in FIGS. 7 and 9 as being secured along end member 300 and operatively connected to end 606 of elongated damper rod 602. End mount assembly 700 can include a mounting bracket 702 that can be secured on or along end member 300 in a suitable manner. For example, mounting bracket 702 can operatively engage section 322 of mounting studs 312 and can be secured thereon by suitable securement devices, such as threaded fasteners 704 operatively engaging helical threads 324, for example. Mounting bracket 702 can at least partially define a mounting cavity 706 with end member 300. End mount assembly 700 can also include an inner mounting element 708 dimensioned for securement on or along end 606 of damper rod 602. It will be appreciated that inner mounting element 708 can be of any suitable size, shape and/or configuration. As one example, inner mounting element 708 can include an element wall 710 with a connector portion 712 dimensioned for securement to the damper rod and a flange portion 714 projecting radially outward from connector portion 712. Flange portion 714 has a first side 716 facing toward connection portion 712 and a second side 718 facing away from the connector portion and toward end member 300.

End mount assembly 700 can include a first plurality of bushing elements 720 disposed along first side 716 of flange portion 714 of the inner mounting element. In a preferred arrangement, bushing elements 720 are disposed in peripherally-spaced relation to one another about axis AX and/or about first side 716 of flange portion 714. End mount assembly 700 can also include a second plurality of bushing elements 722 disposed along second side 718 of flange portion 714 of the inner mounting element. Again, in a preferred arrangement, bushing elements 722 are disposed in peripherally-spaced relation to one another about axis AX and/or about second side 718 of the flange portion of the inner mounting element. In a preferred arrangement, a common quantity of bushing elements 720 and 722 can be used with the bushing elements disposed in an approximately uniform spacing or pattern about axis AX and/or along the respective side of the flange portion of inner mounting element 708. Additionally, in a preferred arrangement, bushing elements 720 and 722 can be arranged on opposing sides of flange portion 714 in an interleaved or otherwise alternating pattern or configuration with respect to one another. It will be appreciated, however, that other configurations and/or arrangements could alternately be used.

In some cases, end mount assembly 700 can, optionally, include a third plurality of bushing elements 724 disposed along one side of the flange portion of the inner mounting element. In the arrangement shown in FIGS. 7 and 9, for example, bushing elements 724 are disposed along second side 718 of flange portion 714. Bushing elements 724 are shown as being disposed in peripherally-spaced relation with one another about axis AX and/or along the second side of the flange portion. Additionally, bushing elements 724 are shown as being positioned radially inward relative to bushing elements 722 with bushing elements 724 interleaved or otherwise disposed between adjacent ones of bushing elements 722.

It will be appreciated that bushing elements 720 and 722 as well as bushing elements 724, if included, can be formed from any suitable material or combination of materials. In a preferred arrangement, bushing elements 720 and 722 as well as bushing elements 724, if included, can be formed from an elastomeric material, such as a natural rubber, a synthetic rubber and/or a thermoplastic elastomer. As one example, such an elastomeric material could have a Shore A durometer within a range of approximately 50 to approximately 90.

It will be appreciated that bushing elements 720 and 722 as well as bushing elements 724, if included, can be secured on or along flange portion 714 of inner mounting element 708 in any suitable manner. In some cases, one or more of the bushing elements can be removably attached to the flange portion of the inner mounting element. In a preferred arrangement, however, some or all of bushing elements 720 and 722 as well as bushing elements 724, if provided, can be permanently attached (i.e., inseparable without damage, destruction or material alteration of at least one of the component parts) to flange portion 714. It will be appreciated that such permanent joints or connections can be formed by way of any one or more processes and/or can include the use of one or more treatments and/or materials. Non-limiting examples of suitable processes can include molding, adhering, curing and/or vulcanizing processes.

In some cases, bushing elements 720 and 722 as well as bushing elements 724, if included, can be disposed within one or more pockets or recesses formed within the inner mounting element. In such cases, the combination of bushing elements and recess walls can be configured to provide a desired combination of spring rate, deflection and/or other performance characteristics. In the arrangement shown in FIGS. 7 and 9, inner mounting element 708 can include a first plurality of recesses 726 that extend into flange portion 714 from along first side 716. In a preferred arrangement, recesses 726 are dimensioned to receive and engage bushing elements 720.

Additionally, or in the alternative, inner mounting element 708 can include a second plurality of recesses 728 can extend into flanged portion 714 from along second side 718.

In a preferred arrangement, recesses 728 are dimensioned to receive and engage bushing elements 722.

Additionally, in a preferred arrangement, the quantity of recesses 726 and 728 can, at a minimum, correspond to the quantity of bushing elements 720 and 722 included in end mount assembly 700. Furthermore, recesses 726 and 728 can be disposed in an approximately uniform spacing or pattern about axis AX and/or along the respective side of the flange portion of inner mounting element 708. Further still, in a preferred arrangement, recesses 726 and 728 can be arranged on opposing sides of flange portion 714 in an interleaved or otherwise alternating pattern or configuration with respect to one another, as discussed above in connection with bushing elements 720 and 722. It will be appreciated, however, that other configurations and/or arrangements could alternately be used.

During use, end mount assembly 700 can permit damper rod 602 to pivot or otherwise move by displacing inner mounting element 708 relative to mounting bracket 702. Such movement of inner mounting element 708 can compress one or more of bushing elements 720 into abutting engagement with mounting bracket 702 and can urge one or more of bushing elements 722 into abutting engagement with end member 300. As displacement of inner mounting element 708 by damper rod 602 increases, bushing elements 720 and 722 begin to compress. As the compression continues to increase, one or more of bushing elements 724 can also contact end member 300 thereby increasing the spring rate and/or reducing further deflection of inner mounting element relative to mounting bracket 702.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and gas damper assembly comprising:
  a flexible spring member having a longitudinal axis and including a flexible wall extending longitudinally between first and second ends and peripherally about said axis to at least partially define a spring chamber;
  a first end member operatively secured to said first end of said flexible spring member such that a substantially fluid-tight seal is formed therebetween;
  a second end member disposed in spaced relation to said first end member and operatively secured to said second end of said flexible spring member such that a substantially fluid-tight seal is formed therebetween, said second end member including an end member wall that includes an outer side wall portion that extends longitudinally along said second end member and an end wall portion oriented transverse to said longitudinal axis, said end member wall at least partially defining an end member cavity disposed radially inward of said outer side wall portion;
  a housing sleeve extending longitudinally between opposing sleeve ends, said housing sleeve including a sleeve wall with an inner surface and an outer surface, said housing sleeve at least partially received within said end member cavity with said inner surface of said sleeve wall at least partially defining a damping chamber;
  a damper rod assembly including a damper piston and an elongated damper rod operatively connected to said damper piston, said damper piston positioned within said damping chamber and including an outer side wall disposed adjacent said inner surface of said housing sleeve, said damper piston separating said damping chamber into first and second chamber portions; and, an end plate disposed along said end wall portion of said second end member, said end plate including an elongated damping passage extending between a first passage end and a second passage end, said elongated damping passage having a spiral configuration with said first passage end disposed in fluid communication with said spring chamber and said second passage end disposed in fluid communication with one of said first and second chamber portions;

said damper rod operatively connected to said first end member such that upon extension and compression of said gas spring and gas damper assembly, said damper piston is reciprocally displaced within said damping chamber and pressurized gas damping is generated from at least pressurized gas transfer through said elongated damping passage between said spring chamber and said damping chamber.

2. A gas spring and gas damper assembly according to claim 1, wherein said end wall portion of said end member wall includes a first side facing toward said first end member and a second side facing away from said first end member with said end plate disposed along said second side of said end wall portion.

3. A gas spring and gas damper assembly according to claim 2, wherein said end plate includes a first plate surface and a second plate surface facing opposite said first plate surface, and said end plate is positioned within said damping chamber and oriented such that said first plate surface is disposed in facing relation to said second side of said end wall portion of said end member wall.

4. A gas spring and gas damper assembly according to claim 3, wherein said elongated damping passage has an open side along said first plate surface of said end plate.

5. A gas spring and gas damper assembly according to claim 1, wherein said end plate has an outer peripheral edge, and one of said sleeve ends of said housing sleeve is disposed in abutting engagement with said outer peripheral edge to at least partially retain said end plate in abutting engagement with said end wall portion of said end member wall.

6. A gas spring and gas damper assembly according to claim 1, wherein said end plate includes an inner peripheral edge at least partially defining an opening through said end plate, and said gas spring and gas damper assembly further comprises a support ring extending through said opening in said end plate, said support ring secured to said end wall portion to at least partially retain said end plate in abutting engagement with said end wall portion of said end member wall.

7. A gas spring and gas damper assembly according to claim 1, wherein said end plate includes a port in fluid communication with one of said first and second passage ends of said elongated damping passage such that pressurized gas transfers between said elongated damping passage and said damping chamber through said port in said end plate.

8. A gas spring and gas damper assembly according to claim 1, wherein said second end member includes an indexing feature formed therealong, and said end plate includes an indexing feature cooperative with said indexing feature of said second end member to rotationally locate said end plate about said axis relative to said second end member.

9. A gas spring and gas damper assembly according to claim 1 further comprising an end cap disposed along one of said sleeve ends opposite said second end member.

10. A gas spring and gas damper assembly according to claim 9, wherein said end plate is a first end plate, said end cap includes an end cap wall that at least partially defines an end cap cavity, and said gas spring and gas damper assembly further comprises a second end plate disposed within said end cap cavity.

11. A gas spring and gas damper assembly according to claim 10, wherein said second end plate has an outer peripheral edge, and one of said sleeve ends of said housing sleeve is disposed in abutting engagement with said outer peripheral edge of said second end plate to at least partially retain said second end plate in abutting engagement with said end cap wall of said end cap.

12. A suspension system comprising:
a pressurized gas system including a pressurized gas source and a control device; and,
at least one gas spring and gas damper assembly according to claim 1 disposed in fluid communication with said pressurized gas source through said control device such that pressurized gas can be selectively transferred into and out of at least said spring chamber.

13. A gas spring and gas damper assembly according to claim 1, wherein said end wall portion of said end member wall of said second end member includes a port in fluid communication with one of said first and second passage ends of said elongated damping passage such that pressurized gas transfers between said elongated damping passage and said spring chamber through said port in said end wall portion of said end member wall.

14. A method of manufacturing a gas spring and gas damper assembly, said method comprising:
providing a flexible spring member having a longitudinal axis and including a flexible wall extending longitudinally between first and second ends and peripherally about said axis to at least partially define a spring chamber;
providing a first end member and securing said first end member across said first end of said flexible spring member such that a substantially fluid-tight seal is formed therebetween;
providing a second end member including an end member wall that includes an outer side wall portion that extends longitudinally along said second end member and an end wall portion oriented transverse to said longitudinal axis with said end member wall at least partially defining an end member cavity disposed radially inward of said outer side wall portion;
securing said second end member across said second end of said flexible spring member such that a substantially fluid-tight seal is formed therebetween;
providing a housing sleeve extending longitudinally between opposing sleeve ends, said housing sleeve including a sleeve wall with an inner surface and an outer surface;
positioning said housing sleeve at least partially within said end member cavity such that said inner surface of said sleeve wall at least partially defines a damping chamber;
providing a damper piston assembly including a damper piston and an elongated damper rod operatively connected to said damper piston, said damper piston including an outer side wall;
positioning said damper piston within said damping chamber such that said outer side wall is disposed adjacent said inner surface of said inner sleeve with said damper piston separating said piston chamber into first and second chamber portions;

providing an end plate that includes an elongated damping passage having a spiral configuration and extending between a first passage end and a second passage end;

positioning said end plate along said end wall portion of said end member wall of said second end member and connecting at least one of said first and second chamber portions in fluid communication with said spring chamber through said elongated damping passage; and, connecting said damper rod to said first end member such that upon extension and compression of said gas spring and gas damper assembly, said damper piston is reciprocally displaced within said damping chamber to generate pressurized gas damping with additional pressurized gas damping being generated from pressurized gas transfer between said spring chamber and said damping chamber through said elongated damping passage.

15. A gas spring and gas damper assembly comprising:

a flexible spring member having a longitudinal axis and including a flexible wall extending longitudinally between first and second ends and peripherally about said axis to at least partially define a spring chamber;

a first end member operatively secured to said first end of said flexible spring member such that a substantially fluid-tight seal is formed therebetween;

a second end member disposed in spaced relation to said first end member and operatively secured to said second end of said flexible spring member such that a substantially fluid-tight seal is formed therebetween, said second end member including an end member wall that includes an outer side wall portion that extends longitudinally along said second end member and an end wall portion oriented transverse to said longitudinal axis, said end wall portion including a first end surface portion facing toward said first end member and a second end surface portion facing away from said first end member, said end member wall at least partially defining an end member cavity disposed radially inward of said outer side wall portion;

a housing sleeve extending longitudinally between opposing sleeve ends, said housing sleeve including a sleeve wall with an inner surface and an outer surface, said housing sleeve at least partially received within said end member cavity with said inner surface of said sleeve wall at least partially defining a damping chamber;

a damper rod assembly including a damper piston and an elongated damper rod operatively connected to said damper piston, said damper piston positioned within said damping chamber and including an outer side wall disposed adjacent said inner surface of said inner sleeve, said damper piston separating said piston chamber into first and second chamber portions; and, an end plate including a first plate surface portion and a second plate surface portion, said end plate disposed adjacent said end wall portion of said end member wall of said second end member such that said first plate surface portion is oriented in facing relation to said second end surface portion, said end plate including an elongated damping passage having a spiral configuration extending between a first passage end and a second passage end with said first passage end disposed in fluid communication with said spring chamber and said second passage end disposed in fluid communication with said damping chamber;

said damper rod operatively connected to said first end member such that upon extension and compression of said gas spring and gas damper assembly, said damper piston is reciprocally displaced within said damping chamber and pressurized gas damping is generated from at least pressurized gas transfer through said elongated damping passage between said spring chamber and said damping chamber.

16. A gas spring and gas damper assembly according to claim 15, wherein said elongated damping passage has an open side along said first plate surface portion of said end plate.

17. A gas spring and gas damper assembly according to claim 15, wherein said end plate has an outer peripheral edge, and one of said sleeve ends of said housing sleeve is disposed in abutting engagement with said outer peripheral edge to at least partially retain said end plate in abutting engagement with said end member wall.

18. A gas spring and gas damper assembly according to claim 15, further comprising a seal operatively disposed between said first plate surface portion of said end plate and said second end surface portion of said end wall portion.

19. A gas spring and gas damper assembly according to claim 15, wherein said end wall portion of said end member wall of said second end member includes an end wall port in fluid communication with said first passage end of said elongated damping passage such that pressurized gas transfers between said elongated damping passage and said spring chamber through said end wall port.

20. A gas spring and gas damper assembly according to claim 15, wherein said end plate includes an end plate port in fluid communication with said second passage end of said elongated damping passage such that pressurized gas transfers between said elongated damping passage and said damping chamber through said end plate port.

* * * * *